(12) United States Patent
Aridome et al.

(10) Patent No.: US 8,229,616 B2
(45) Date of Patent: Jul. 24, 2012

(54) CHARGING/DISCHARGING CONTROL SYSTEM FOR HYBRID VEHICLE AND METHOD FOR CONTROLLING SAME

(75) Inventors: Koji Aridome, Toyota (JP); Kiyohito Machida, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/203,919

(22) PCT Filed: Mar. 5, 2009

(86) PCT No.: PCT/JP2009/054145
§ 371 (c)(1),
(2), (4) Date: Sep. 27, 2011

(87) PCT Pub. No.: WO2010/100736
PCT Pub. Date: Sep. 10, 2010

(65) Prior Publication Data
US 2012/0016547 A1    Jan. 19, 2012

(51) Int. Cl.
*B60W 10/26* (2006.01)
*H02J 7/00* (2006.01)
*G06F 19/00* (2006.01)

(52) U.S. Cl. ............... 701/22; 701/32.2; 180/65.265

(58) Field of Classification Search .............. 701/22, 701/32.2, 34.4; 180/65.265; 320/109; 318/53
See application file for complete search history.

(56) References Cited

U.S. PATENT DOCUMENTS

| | | | |
|---|---|---|---|
| 6,608,396 B2 | 8/2003 | Downer et al. | |
| 2006/0052915 A1 | 3/2006 | Sato | |
| 2008/0125928 A1* | 5/2008 | Conlon et al. | 701/22 |
| 2009/0005923 A1* | 1/2009 | Shimizu et al. | 701/22 |
| 2009/0015202 A1* | 1/2009 | Miura | 320/132 |
| 2009/0058326 A1* | 3/2009 | Oyobe et al. | 318/53 |

FOREIGN PATENT DOCUMENTS

| | | |
|---|---|---|
| JP | A-2002-354692 | 12/2002 |
| JP | A-2003-209969 | 7/2003 |
| JP | A-2004-274945 | 9/2004 |
| JP | A-2008-109840 | 5/2008 |
| JP | A-2008-167620 | 7/2008 |
| JP | A-2008-247081 | 10/2008 |

OTHER PUBLICATIONS

International Search Report mailed May 26, 2009 issued in International Patent Application No. PCT/JP2009/054145 (with translation).

* cited by examiner

*Primary Examiner* — Tan Q Nguyen
(74) *Attorney, Agent, or Firm* — Oliff & Berridge, PLC

(57) ABSTRACT

In a traveling mode for controlling traveling of a hybrid vehicle to maintain a charge amount of a power storage device of the hybrid vehicle to fall within a predetermined control range, when a malfunction associated with the power storage device takes place, a control center value defining the control range is set higher than a control center value employed in a normal state and set at a value near a management lower limit value of the charge amount. Then, it is permitted to charge/discharge the power storage device. In this way, upon occurrence of a malfunction of a level that does not require immediate interruption of the charging/discharging of the power storage device, a vehicle operation can be continued using the power storage device while protecting the power storage device.

20 Claims, 9 Drawing Sheets

SOCr# > SOCr, Sth# > Sth

CHARGING/DISCHARGING CONTROL SYSTEM FOR HYBRID VEHICLE AND METHOD FOR CONTROLLING SAME

TECHNICAL FIELD

The present invention relates to a charging/discharging control system for a hybrid vehicle and a method for controlling it, more particularly, charging/discharging control upon occurrence of a malfunction associated with a power storage device.

BACKGROUND ART

As environmentally friendly vehicles, hybrid vehicles have been developed and put into practical use. Each of the hybrid vehicles includes: a motor for generating vehicle driving power; a power storage device for storing electric power for driving the motor; and an internal combustion engine. Further, output of the internal combustion engine is used as the vehicle driving power and/or motive power for generating electric power to charge the power storage device. Such a conventional hybrid vehicle generally performs charging/discharging control to maintain an SOC (State Of Charge) at a 50-60% level of the fully charged state, in order to secure electric power for generating driving power by the motor while permitting reception of regenerative power upon regenerative braking. The SOC is indicative of a remaining level of the power storage device.

Particularly, in recent years, it has been proposed to charge a vehicular power storage device of such a hybrid vehicle using a power source external to the vehicle (hereinafter, also referred to as "external power source"). In the hybrid vehicle chargeable by the external power source such as a plug-in type hybrid vehicle, for improved energy efficiency, charging/discharging control is oriented to externally charging the power storage device to the fully charged state level before starting traveling and to consuming the electric power in the power storage device up to a value near an SOC management lower limit value when ending the traveling.

Further, for example, Japanese Patent Laying-Open No. 2003-209969 (PTL 1) and Japanese Patent Laying-Open No. 2008-109840 (PTL 2) describe that a plurality of power storage devices (batteries) are connected to one another in parallel in order to achieve a longer traveling distance using electric power stored in the vehicular power storage devices.

PTL 1 describes a power source system controlled by equalizing charging/discharging of each of the power storage devices by arranging converters respectively corresponding to the plurality of power storage devices arranged in parallel. PTL 2 describes that charging/discharging control is performed in accordance with a distribution ratio of charging/discharging electric power among the plurality of power storage devices. The distribution ratio is sequentially calculated in accordance with a ratio of permitted charging/discharging levels among the power storage devices. In this way, even when the plurality of power storage devices have different charging/discharging properties, the system can exhibit its maximum performance.

PTL 1: Japanese Patent Laying-Open No. 2003-209969
PTL 2: Japanese Patent Laying-Open No. 2008-109840

SUMMARY OF INVENTION

Technical Problem

As described above, in the hybrid vehicle chargeable using an external power source, the charging/discharging control is required to be highly precise because the SOC is changed to a value near the SOC management lower limit value determined by the property of each power storage device (representatively, battery). Accordingly, if the vehicle continues to be driven using the power storage device when a malfunction takes place to presumably decrease precision of the charging/discharging control in a power storage device system including the power storage device and relevant sensor and monitoring device, overdischarging may take place which exceeds the SOC management lower limit value. Specifically, the decrease in the precision of control may result in the actual SOC decreasing to fall within a range below the SOC management lower limit value even when the control itself is normal. Accordingly, performance of the power storage device may be damaged.

However, the user's convenience is considered to be compromised if it is prohibited without exception to charge or discharge a power storage device whenever some malfunction takes place in the power storage device system, with the greatest emphasis on protection of the power storage device.

The present invention has been made to solve the foregoing problem, and has its object to continuously use a power storage device while protecting the power storage device from overdischarging even when a malfunction takes place to presumably decrease precision of charging/discharging control in a hybrid vehicle chargeable by an external power source, so as to achieve protection of the power storage device and improvement of user's convenience at the same time.

Solution to Problem

A charging/discharging control system for a hybrid vehicle in the present invention is a charging/discharging control system for a hybrid vehicle including an internal combustion engine and a motor each serving as a motive power source, and a power storage device configured to be capable of receiving and supplying electric power from and to the motor. The charging/discharging control system includes an externally charging unit, an electric power generating unit, a charge state estimating unit, a traveling control unit, and a malfunction processing unit. The externally charging unit is configured to charge the power storage device using an electric power source external to the vehicle. The electric power generating unit is configured to generate electric power for charging the power storage device, using an output of the internal combustion engine. The charge state estimating unit is configured to estimate a remaining level in the power storage device based on a state detection value of the power storage device. The traveling control unit controls operations of the internal combustion engine and the motor to encourage internal charging using the electric power generating unit when a remaining level estimate value obtained from the charge state estimating unit is decreased to fall below a control target during a vehicle operation in a first traveling mode in which the internal combustion engine and the motor are used to maintain the remaining level of the power storage device within a predetermined control range. The malfunction detecting unit is configured to detect a malfunction associated with the power storage device. The malfunction processing unit is configured to set the control target at a value higher than that employed when no malfunction is detected, when the malfunction detecting unit detects the malfunction.

In a method for controlling a charging/discharging control system for a hybrid vehicle in the present invention, the hybrid vehicle includes an internal combustion engine and a motor each serving as a motive power source, and a power storage device configured to receive and supply electric power from and to the motor. The charging/discharging control system includes the above-described externally charging unit and the above-described electric power generating unit. The method includes the steps of: detecting a malfunction associated with the power storage device; setting a control target of a remaining level of the power storage device at a value higher than that employed when no malfunction is detected, when the malfunction is detected during a vehicle operation in a first traveling mode in which the internal combustion engine and the motor are used to maintain the remaining level of the power storage device within a predetermined control range; calculating a remaining level estimate value of the power storage device based on a state detection value of the power storage device; and controlling operations of the internal combustion engine and the motor to encourage internal charging using the electric power generating unit when the remaining level estimate value is decreased to fall below the control target during the vehicle operation in the first traveling mode.

Preferably, when the malfunction is detected, the control target of the remaining level is set to attain a margin such that even when the remaining level estimate value is decreased to reach the control target, an actual remaining level of the power storage device or a part of plurality of power storage units thereof is not decreased to reach a management lower limit value.

According to the charging/discharging control system for the hybrid vehicle and the method for controlling it, when a malfunction associated with the power storage device takes place in the hybrid vehicle externally chargeable, the control target of the remaining level (SOC) in the first traveling mode (HV mode) that employs the internal combustion engine and the motor is set higher than that in the normal state and the charging/discharging control is then performed. In this way, even when a malfunction takes place to presumably decrease precision of the charging/discharging control but the power storage device is continued to be charged/discharged, the power storage device can be avoided from overdischarging to fall below the SOC management lower limit value. As a result, when the malfunction takes place, the power storage device can be protected and the user's convenience can be attained without prohibiting charging/discharging of the power storage device without exception.

Preferably, the traveling control unit includes a traveling mode selecting unit. The traveling mode selecting unit is configured to select a second traveling mode until the remaining level estimate value is decreased to reach a mode determination value, and select the first traveling mode once the remaining level estimate value is decreased to reach the mode determination value. In the second traveling mode, the internal combustion engine and the motor are used to travel mainly using the motor with the internal charging being stopped. The malfunction processing unit is configured to set the mode determination value at a value higher than that employed when no malfunction is detected, when the malfunction is detected during the vehicle operation in the second traveling mode.

Alternatively, the method further includes the steps of: selecting a second traveling mode until the remaining level estimate value is decreased to reach a mode determination value, and selecting the first traveling mode once the remaining level estimate value is decreased to reach the mode determination value, in the second traveling mode, the internal combustion engine and the motor being used to mainly travel using the motor with the internal charging being stopped; and setting the mode determination value, which is employed in the step of selecting, at a value higher than that employed when no malfunction is detected, when the malfunction is detected during a vehicle operation in the second traveling mode.

More preferably, when the malfunction is detected, the mode determination value is set to attain a margin such that even when the remaining level estimate value is decreased to reach the mode determination value, an actual remaining level of the power storage device or each of the power storage units is not decreased to reach a management lower limit value.

In this way, when a malfunction associated with the power storage device takes place in the hybrid vehicle chargeable by the external power source during a vehicle operation in the second traveling mode (EV mode) that mainly employs the motor for traveling, the switching determination value (mode determination value) for switching from the EV mode to the HV mode is set higher than that in the normal state. In this way, even when a malfunction takes place to presumably decrease precision in the charging/discharging control but the power storage device is continued to be charged/discharged, the power storage device can be avoided from overdischarging to fall below the SOC management lower limit value both in the EV mode and the HV mode.

Alternatively, preferably, the malfunction detecting unit stratifies detected malfunctions into first and second levels. When a malfunction of the first level is detected, the malfunction processing unit generates an interrupt request made for an opening/closing device to interrupt a charging/discharging path for the power storage device, and when a malfunction of the second level is detected, the malfunction processing unit sets the control target and/or the mode determination value at value(s) higher than that (those) employed when no malfunction is detected, without generating the interrupt request.

Alternatively, the method further includes the steps of: stratifying detected malfunctions into first and second levels; and when a malfunction of the first level is detected, generating an interrupt request made for an opening/closing device to interrupt a charging/discharging path for the power storage device. When a malfunction of the second level is detected, the step of setting sets the control target and/or the mode determination value at value(s) higher than that (those) employed when no malfunction is detected, without generating the interrupt request.

In this way, in accordance with the level of a detected malfunction, either prohibition of charging/discharging the power storage device or continuation of charging/discharging it while securing protection of the power storage device can be adopted. Hence, processing upon occurrence of a malfunction can be performed more appropriately.

Preferably, the power storage device includes a plurality of power storage units, and the charge state estimating unit is configured to calculate the remaining level estimate value for each of the plurality of power storage units. The charging/discharging control system further includes: a power control unit configured to control bidirectional conversion of electric power between the power storage device and each of the motor and the electric power generator; a plurality of opening/closing devices provided between the power control unit and the plurality of power storage units; and a connection changing unit configured to control connection between each of the plurality of power storage units and the power control unit by controlling the plurality of opening/closing devices. In the first traveling mode, the connection changing unit connects a part of the plurality of power storage units to the power control unit, and during the vehicle operation in the first traveling mode, the traveling control unit controls operations of the internal combustion engine and the motor to encourage the internal charging, when the remaining level estimate value of the part of the plurality of power storage units is decreased to fall below the control target. Alternatively, in the method, the step of calculating calculates the remaining level estimate value for each of the plurality of power storage units, and during the vehicle operation in the first traveling mode, the step of controlling controls operations of the internal combustion engine and the motor to encourage internal charging using the electric power generating unit, when the remaining level estimate value of the part of the plurality of power storage units is decreased to fall below the control target.

In this way, even when a malfunction takes place to presumably decrease precision of the charging/discharging but each power storage unit is continued to be charged/discharged in the hybrid vehicle configured to be capable of selectively using the plurality of power storage units, each of the power storage units can be avoided from overdischarging to fall below the SOC management lower limit value in the HV mode.

More preferably, the plurality of power storage units are classified into a main power storage unit and at least one auxiliary power storage unit(s). The traveling control unit includes a traveling mode selecting unit. The traveling mode selecting unit is configured to select a second traveling mode until the remaining level estimate value of each of the power storage units is decreased to reach a mode determination value, and select the first traveling mode once the remaining level estimate value of each of the power storage units is decreased to reach the mode determination value. In the second traveling mode, the internal combustion engine and the motor are used to travel mainly using the motor with the internal charging being stopped. The connection changing unit is configured to connect the main power storage unit to the power control unit and disconnect each auxiliary power storage unit from the power control unit in the first traveling mode, and is configured to connect the main power storage unit to the power control unit and connect the at least one auxiliary power storage unit(s) to the power control unit one after another in the second traveling mode to use each auxiliary power storage unit sequentially until the remaining level estimate value of each auxiliary power storage unit is decreased to reach the mode determination value. When the malfunction is detected during the vehicle operation in the second traveling mode, the malfunction processing unit is configured to set the mode determination value at a value higher than that employed when no malfunction is detected. Alternatively, the method further includes the steps of: selecting the second traveling mode until the remaining level estimate value of each of the power storage units is decreased to reach the mode determination value, and selecting the first traveling mode once the remaining level estimate value of each of the power storage units is decreased to reach the mode determination value; and setting the mode determination value, which is employed in the step of selecting, at a value higher than that employed when no malfunction is detected, when the malfunction is detected during the vehicle operation in the second traveling mode.

In this way, when a malfunction takes place to presumably decrease precision in the charging/discharging control but the power storage device is continued to be charged/discharged in the hybrid vehicle configured to be capable of selectively using the plurality of power storage units, the power storage device can be avoided from overdischarging to fall below the SOC management lower limit value both in the EV mode and the HV mode.

More preferably, the malfunction detecting unit stratifies detected malfunctions into first and second levels. When a malfunction of the first level is detected, the malfunction processing unit generates a forcible interrupt request made for the plurality of opening/closing devices, and when a malfunction of the second level is detected, the malfunction processing unit sets the control target and/or the mode determination value at value(s) higher than that (those) employed when no malfunction is detected, without generating the interrupt request.

Alternatively, the method further includes the steps of: stratifying detected malfunctions into first and second levels; and when a malfunction of the first level is detected, generating a forcible interrupt request made for the plurality of opening/closing devices. When a malfunction of the second level is detected, the step of setting sets the control target and/or the control target at value(s) higher than that (those) employed when no malfunction is detected, without generating the interrupt request.

In this way, in accordance with the level of a malfunction of the power storage device system as detected in the hybrid vehicle configured to be capable of selectively using the plurality of power storage units, either prohibition of charging/discharging the power storage device or continuation of charging/discharging it while securing protection of the power storage device can be adopted. Hence, processing upon occurrence of a malfunction can be performed more appropriately.

Advantageous Effects of Invention

According to the present invention, even when a malfunction takes place to presumably decrease precision in charging/discharging control in a hybrid vehicle chargeable by an external power source, a power storage device thereof is continued to be used while protecting the power storage device from overdischarging, thereby protecting the power storage device and achieving improved user's convenience at the same time.

Figure 1:
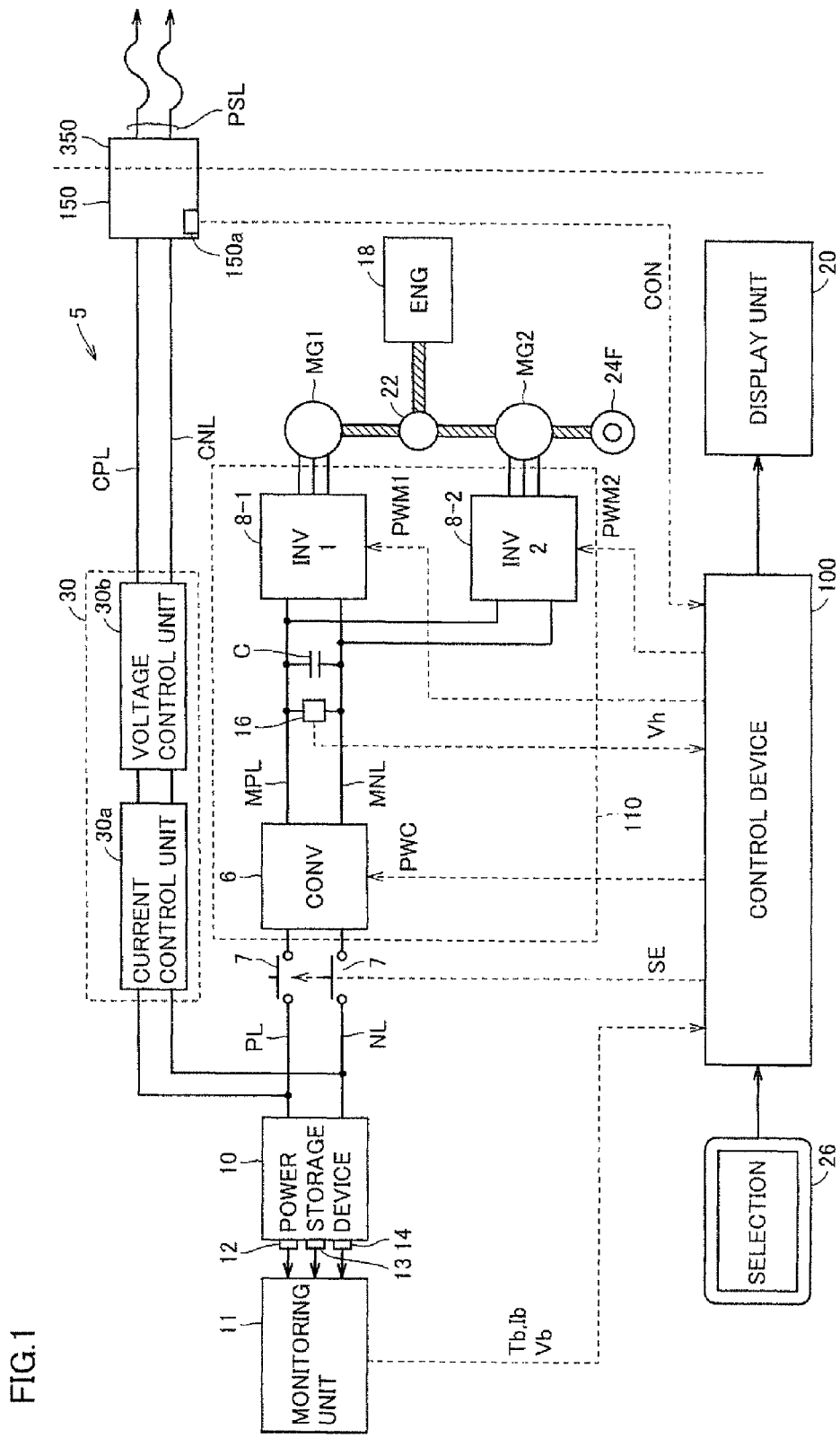
FIG. 1 is a schematic view showing a configuration of a hybrid vehicle to which charging/discharging control for a hybrid vehicle according to the embodiment of the present invention is applied.

REFERENCE SIGNS LIST 5, 5#: hybrid vehicle; 6, 6M, 6S: converter; 7, 7m: system main relay; 7a, 7b: relay; 8-1, 8-2: inverter; 10: power storage device; 10M: main power storage device; 10Sa, 10Sb: auxiliary power storage device; 11, 11M, 11Sa, 11Sb: monitoring unit; 12, 12M, 12Sa, 12Sb: temperature sensor; 13, 13M, 13Sa, 13Sb, 15m, 15s, 16: voltage sensor; 14, 14M, 14Sa, 14Sb, 17: current sensor; 18: engine (internal combustion engine); 20: display unit; 22: power split device; 24F: driving wheel; 26: selection switch; 30: externally charging unit; 30a: current control unit; 30b: voltage converting unit; 42-1: chopper circuit; 100: control device (ECU); 110: power control unit; 150: connector receiving portion; 150a: connection detecting sensor; 200: state estimating unit; 204: distributing unit; 206: converter control unit; 208: inverter control unit; 210: traveling control unit; 215: traveling mode selecting unit; 220: malfunction detecting unit; 230: malfunction processing unit; 300: charging/discharging control unit; 310: power distribution ratio calculating unit; 320: command generating unit; 330: converter control unit; 340: connection changing unit; 350: connector portion; 500: change of SOC (normal state); 510: change of SOC (when a malfunction takes place); C, C1: smoothing capacitor; CNL: negative charging line; CON: connecting signal; CPL: positive charging line; CVm, CVs: control command (converter); D1A, D1B: diode; Ib: current (power storage device); IGON: ignition ON command; IL: current (converter); L1: inductor; LN1A: positive line; LN1B: wire; LN1C: negative line; MD: signal (traveling mode); MG1, MG2: motor generator; MNL: negative bus; MPL: positive bus; NL, NLs: negative line; Pb: charging/discharging power (entire); Pbm: charging/discharging power (main power storage device); Pbs: charging/discharging power (auxiliary power storage device); PL, PLs: positive line; PSL: power line (external charging); PWC, PWCm, PWCs, PWM1, PWM2: switching command; PWC1A, PWC1B: driving signal; Q1A, Q1B: switching element; SE, RYa, RYb: relay control signal; SOC: control center value (normal state); SOC#: control center value (when a malfunction is detected); Sth: mode determination value (normal state); Sth#: mode determination value (when a malfunction is detected); Tb: temperature (power storage device); Vb: voltage (power storage device).

DESCRIPTION OF EMBODIMENTS

The following describes an embodiment of the present invention in detail with reference to figures. It should be noted that the same or corresponding portions in the below-mentioned figures are given the same reference characters and are not described repeatedly in principle.

(Schematic Configuration of Vehicle)

FIG. 1 is a schematic diagram of a configuration of a hybrid vehicle to which charging/discharging control in the embodiment of the present invention is applied.

Referring to FIG. 1, hybrid vehicle 5 includes an internal combustion engine (engine) 18 and motor generators MG1, MG2. Hybrid vehicle 5 controls respective driving power received from engine 18 and motor generators MG1, MG2 to be at an optimum ratio for traveling. Hybrid vehicle 5 further includes a power storage device 10 capable of supplying/receiving electric power to/from motor generators MG1, MG2. Power storage device 10 is a chargeable/dischargeable power storage element, and is constituted by, representatively, a secondary battery such as a lithium ion battery or a nickel hydride battery, or an electric double layer capacitor. FIG. 1 shows a system configuration associated with control for charging/discharging power storage device 10 in hybrid vehicle 5.

Power storage device 10 can be charged by receiving electric power generated using output of engine 18 in a system startup state (hereinafter, also referred to as "IG ON state") of hybrid vehicle 5. Power storage device 10 can be also charged by a power source external to the vehicle (not shown; hereinafter, also referred to as "external power source") and electrically connected thereto via a connector portion 350 during system halt of hybrid vehicle 5 (hereinafter, also referred to as "IG OFF state"). It should be noted that the electric power supplied from the external power source to hybrid vehicle 5 via connector portion 350 may be electric power generated by a solar cell panel installed on a roof of a house, instead of or in addition to a commercial power source. In the description below, charging power storage device 10 using the external power source is also referred to as "external charging" and charging power storage device 10 by means of an operation of engine 18 is also referred to as "internal charging" for discrimination of the respective charging operations.

A monitoring unit 11 outputs a temperature Tb, a voltage Vb, and a current Ib as state detection values of power storage device 1010, based on respective outputs of a temperature sensor 12, a voltage sensor 13, and a current sensor 14 provided in power storage device 10. Temperature sensor 12, voltage sensor 13, and current sensor 14 comprehensively represent temperature sensors, voltage sensors, and current sensors provided in power storage device 10, respectively. In other words, actually, a plurality of temperature sensors 12, voltage sensors 13, and/or current sensors 14 are generally provided.

Engine (ENG) 18, first motor generator MG1, and second motor generator MG2 included in hybrid vehicle 5 serve as driving power sources, and are mechanically connected to one another via a power split device 22. In accordance with a traveling state of hybrid vehicle 5, the driving power is distributed and combined among the above-described three components by means of power split device 22, thereby driving driving wheels 24F.

During traveling of hybrid vehicle 5 (i.e., while the external charging is not performed), power split device 22 splits driving power generated by operation of engine 18 into two, one of which is distributed to first motor generator MG1 and the other of which is distributed to second motor generator MG2. The driving power distributed from power split device 22 to first motor generator MG1 is used for an operation of generating electric power. On the other hand, the driving power distributed to second motor generator MG2 is combined with driving power generated by second motor generator MG2, and is then used to drive driving wheels 24F.

Hybrid vehicle 5 further includes a power control unit 110. Power control unit 110 is configured to be capable of bidirectionally converting electric power between power storage device 10 and each of first motor generator MG1 and second motor generator MG2. Power control unit 110 includes a converter (CONV) 6, and a first inverter (INV1) 8-1 and a second inverter (INV2) 8-2 respectively associated with motor generators MG1 and MG2.

Converter (CONV) 6 is configured to bidirectionally convert DC voltage between power storage device 10 and a positive bus MPL, which transfers a DC link voltage of each of inverters 8-1, 8-2. Namely, the input/output voltage of power storage device 10 and the DC voltage between positive bus MPL and negative bus MNL are bidirectionally stepped up or down. The operation of stepping up or down in converter 6 is controlled by a switching command PWC from control device 100. Further, a smoothing capacitor C is connected between positive bus MPL and negative bus MNL. Further, the DC voltage between positive bus MPL and negative bus MNL is detected by a voltage sensor 16.

Each of first inverter 8-1 and second inverter 8-2 bidirectionally converts electric power between the DC power of positive bus MPL and negative bus MNL and the AC power supplied to/from motor generator MG1 and MG2. Mainly, in accordance with a switching command PWM1 from control device 100, first inverter 8-1 converts AC power generated by first motor generator MG1 to DC power, and supplies it to positive bus MPL and negative bus MNL. On the other hand, in accordance with a switching command PWM2 from control device 100, second inverter 8-2 converts DC power supplied via positive bus MPL and negative bus MNL into AC power, and supplies it to second motor generator MG2. In other words, hybrid vehicle 5 includes: second motor generator MG2 capable of receiving electric power from power storage device 10 to generate driving power; and first motor generator MG1, which is an electric power generating unit capable of generating electric power using received output of engine 18.

Between power storage device 10 and power control unit 110, a system main relay 7 is provided which is inserted in and connected to positive line PL and negative line NL. System main relay 7 is turned on/off in response to a relay control signal SE from control device 100. System main relay 7 is employed as a representative example of an "opening/closing device" capable of interrupting the charging/discharging path for power storage device 10. Any type of opening/closing device can be employed instead of system main relay 7.

Control device 100 is representatively constituted by an electronic control unit (ECU). The ECU is mainly constituted by a CPU (Central Processing Unit); a storage unit such as a RAM (Random Access Memory) or a ROM (Read Only Memory); and an input/output interface. In control device 100, the CPU reads out, to the RAM, a program stored in advance in the ROM and executes it, thereby performing control associated with the vehicle traveling (inclusive of the internal charging) and the external charging. It should be noted that at least a part of the ECU may be configured to perform predetermined mathematical/logical computations using hardware such as an electronic circuit.

As exemplary information input to control device 100, FIG. 1 illustrates temperature Tb, voltage Vb, and current Ib of power storage device 10, as well as a system voltage Vh. Temperature Tb, voltage Vb, and current Ib are provided from monitoring unit 11 and system voltage Vh is provided from voltage sensor 16 positioned between the lines of positive bus MPL and negative bus MNL.

Further, control device 100 continuously estimates a state of charge (SOC), which represents a remaining level in power storage device 10. It should be noted that the SOC represents an amount of charges (amount of remaining charges) relative to charges in the fully charged state of power storage device 10. As one example, the SOC is indicated by a ratio (0-100%) of an amount of currently remaining charges to an amount of charges in the fully charged level. For example, control device 100 sequentially calculates an SOC estimate value of power storage device 10 based on an integrated value of the charging/discharging amounts of power storage device 10. It should be noted that the integrated value of the charging/discharging amounts is obtained by temporally integrating a product (electric power) of corresponding voltage and current of the power storage unit. Alternatively, the SOC estimate may be found based on a relation between an open circuit voltage (OCV) and the SOC.

Hybrid vehicle 5 further includes a connector receiving portion 150 and an externally charging unit 30 both for charging power storage device 10 using an external power source.

In order to externally charge power storage device 10, connector portion 350 is connected to connector receiving portion 150, thereby supplying electric power from the external power source to externally charging unit 30 via a positive charging line CPL and a negative charging line CNL. Further, connector receiving portion 150 includes a connection detecting sensor 150a for detecting a state of connection between connector receiving portion 150 and connector portion 350. Based on a connecting signal CON from connection detecting sensor 150a, control device 100 detects that hybrid vehicle 5 has entered a state in which it can be charged by the external power source. It should be noted that the present embodiment illustrates a case where a commercial power source of single-phase AC is employed as the external power source.

Connector portion 350 representatively constitutes a connecting structure for supplying hybrid vehicle 5 with electric power from the external power source such as a commercial power source. Connector portion 350 is connected to a charging station (not shown) including the external power source, via a power line PSL constituted by a cabtire cable and the like. Further, connector portion 350 is connected to hybrid vehicle 5 for the external charging, so as to electrically connect the external power source to externally charging unit 30 provided in hybrid vehicle 5. Meanwhile, hybrid vehicle 5 is provided with connector receiving portion 150 connected to connector portion 350 to receive electric power from the external power source.

It should be noted that instead of the configuration shown in FIG. 1, hybrid vehicle 5 may be configured to receive electric power supplied from the external power source by means of electromagnetic coupling without contact between the external power source and the vehicle, specifically, may be configured to receive electric power by means of mutual inductance between a primary coil provided at the external power source side and a secondary coil provided at the vehicle side.

Externally charging unit 30 is a device for receiving electric power from the external power source and charging power storage device 10, and is provided between each of a positive line PL and a negative line NL and each of a positive charging line CPL and a negative charging line CNL.

Further, externally charging unit 30 includes a current control unit 30a and a voltage converting unit 30b, and converts electric power supplied from the external power source into electric power suitable for charging power storage device 10. Specifically, voltage converting unit 30b is a device for converting a voltage supplied from the external power source into a voltage suitable for charging power storage device 10. Representatively, voltage converting unit 30b is constituted by a winding wire type transformer having a predetermined transformation ratio, an AC-AC switching regulator, or the like. Further, current control unit 30a rectifies the AC voltage converted by voltage converting unit 30b, to generate a DC voltage. In addition, current control unit 30a controls a charging current to be supplied to power storage device 10, in accordance with a charging current command from control device 100. Current control unit 30a is representatively constituted by a bridge circuit of single phase. It should be noted that instead of the configuration including current control unit 30a and voltage converting unit 30b, externally charging unit 30 may be implemented using an AC-DC switching regulator or the like.

As described above, in hybrid vehicle 5, driving power from engine 18 can be employed for traveling of hybrid vehicle 5 and charging of power storage device 10. Meanwhile, in the case where power storage device 10 is externally charged and is used, it is preferable to maintain engine 18 at a halt state as much as possible during traveling for the sake of energy efficiency. Accordingly, hybrid vehicle 5 is configured to be capable of traveling in two modes: an EV (Electric Vehicle) mode and an HV (Hybrid Vehicle) mode.

In the EV traveling mode, hybrid vehicle 5 travels using only driving power mainly provided by second motor generator MG2, until the SOC of power storage device 10 falls below a predetermined mode determination value. In this EV mode, it is restricted to internally charge power storage device 10. Hence, basically, first motor generator MG1 does not receive driving power from engine 18 and does not perform the electric power generation operation. Although engine 18 is maintained at the halt state in the EV mode in order to improve a fuel consumption rate, engine 18 may be started up in the following cases: a case where a driver provides a driving power request for abrupt acceleration or the like; a case where the driver provides a request irrelevant to the driving power such as catalyst warming or an air conditioning request; and a case where other conditions are established.

When the SOC of power storage device 10 is decreased to reach the mode determination value during the EV mode, the traveling mode is switched to the HV mode. In the HV mode, the internal charging by first motor generator MG1 is controlled to maintain the SOC of power storage device 10 within a predetermined control range. Namely, engine 18 starts to operate in response to the start of the internal charging performed by first motor generator MG1. It should be noted that part of driving power generated by the operation of engine 18 may be used for the traveling of hybrid vehicle 5.

In the HV mode, in order to optimize an overall fuel consumption, control device 100 determines target values for rotational speed of engine 18, an amount of electric power generated by first motor generator MG1, and a torque of second motor generator MG2, based on a signal from each sensor, a traveling condition, an accelerator position, and the like.

For the determination of the target values, the SOC of power storage device 10 is also considered. That is, electric power charged to and discharged from power storage device 10 is managed to maintain the SOC of power storage device 10 to fall within a predetermined control range having a predetermined control center value as its center. Namely, the electric power charged to and discharged from power storage device 10 correspond to a difference between electric power generated by first motor generator MG1 receiving part of motive power from engine 18 and electric power consumed by second motor generator MG2 to generate driving power. Hence, in accordance with the SOC of power storage device 10, the amount of electric power generated by first motor generator MG1, and the electric power consumed by second motor generator MG2 are determined. It should be noted that the electric power charged to and discharged from power storage device 10 are also influenced by the traveling condition of hybrid vehicle 5. Hence, the "predetermined control range" in which the SOC of power storage device 10 is to be maintained may not be defined definitely. However, by shifting the control center value, the control range can be increased or decreased relatively.

As such, hybrid vehicle 5 according to the present embodiment is an externally chargeable hybrid vehicle. In hybrid vehicle 5, the traveling mode is switched in accordance with the SOC of power storage device 10. Further, this switching of the traveling mode can be made by a user operating a selection switch 26 provided in the vicinity of the driver's seat. More specifically, the user can forcibly select the HV mode or the EV mode by providing an operational input to selection switch 26.

Hybrid vehicle 5 further includes a display unit 20 for visually indicating the driving condition of the vehicle to the driver. As one example, in association with the traveling mode, the traveling mode of hybrid vehicle 5 is displayed on display unit 20. Alternatively, depending on circumstances, a message urging selection of a traveling mode may be provided to the user.

Regarding a correlation between the embodiment shown in FIG. 1 in the present invention and the invention of the present application, power storage device 10 corresponds to a "power storage device", second motor generator MG2 corresponds to a "motor", engine 18 corresponds to an "internal combustion engine", and first motor generator MG1 corresponds to an "electric power generating unit". Further, the "EV traveling mode" corresponds to a "second traveling mode", and the "HV traveling mode" corresponds to a "first traveling mode".

(Control Structure)

Figure 2:
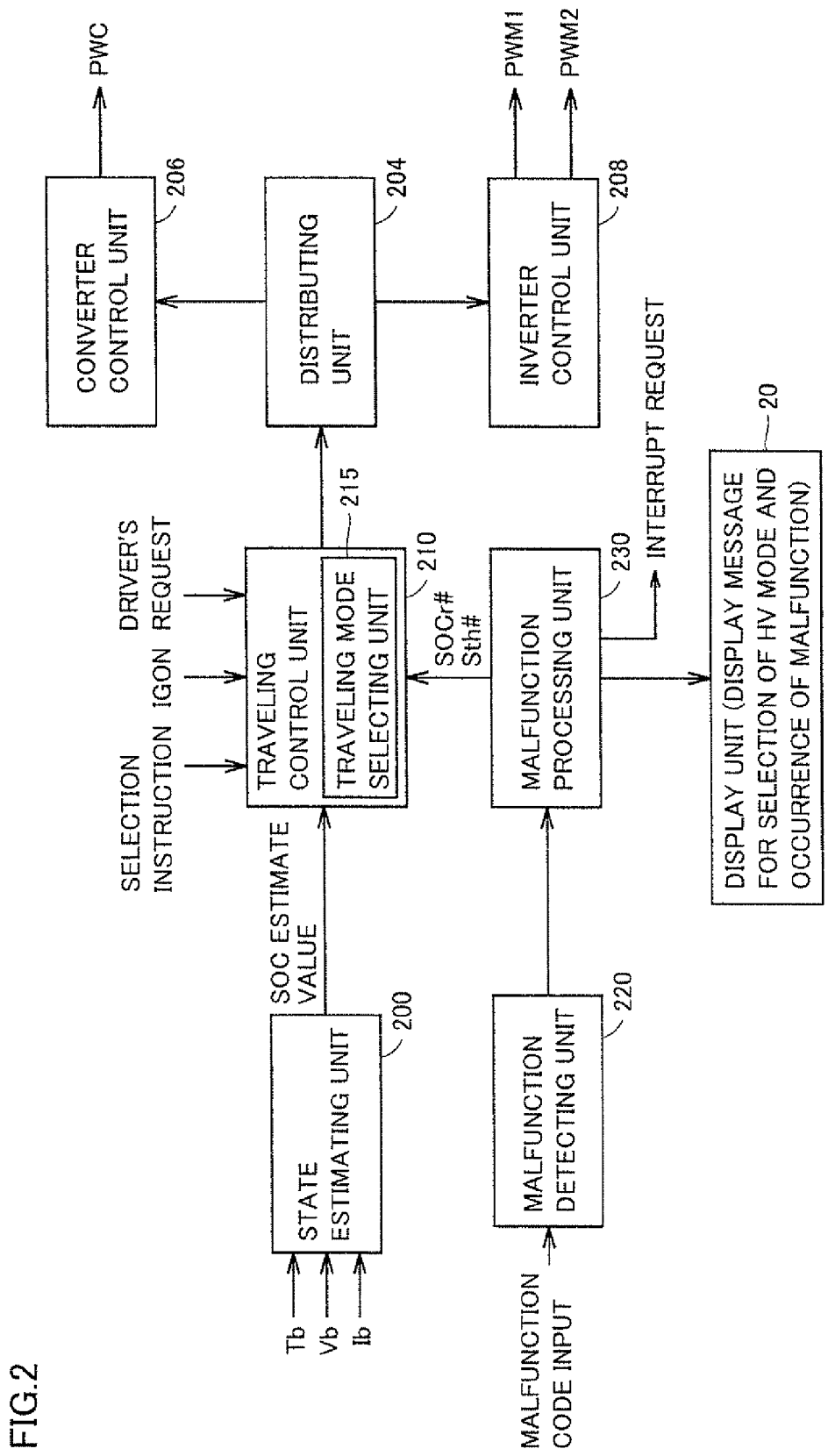
FIG. 2 is a function block diagram illustrating a control structure associated with the charging/discharging control for the power storage device in the hybrid vehicle of FIG. 1.

With reference to FIG. 2, the following describes a control structure concerned with the charging/discharging control for the power storage device of the hybrid vehicle shown in FIG. 1.

Referring to FIG. 2, control device 100 includes a state estimating unit 200, a traveling control unit 210, a distributing unit 204, a converter control unit 206, an inverter control unit 208, a malfunction detecting unit 220, and a malfunction processing unit 230. Each block shown in FIG. 2 may be constituted by a circuit (hardware) having a function corresponding to the block, or may be implemented by the ECU performing software processing in accordance with a predetermined program.

State estimating unit 200 continuously estimates the SOC, which represents the remaining level in power storage device 10, based on temperature Tb, current Ib, and voltage Vb, which are state detection values of power storage device 10. The SOC estimate value thus estimated by state estimating unit 200 is provided to traveling control unit 210.

Further, based on the estimated SOC, temperature Tb of power storage device 10, and the like, state estimating unit 200 calculates upper limit values (Win, Wout) for electric power charged to and discharged from power storage device 10. Win, Wout are also reflected in the traveling control performed by traveling control unit 210.

Traveling control unit 210 has a traveling mode selecting unit 215 for selecting a traveling mode between the HV mode and the EV mode. When the driver operates to provide an ignition ON command IGON, traveling mode selecting unit 215 selects a traveling mode of hybrid vehicle 5 based on the SOC estimate value provided from state estimating unit 200 and a selection command provided from selection switch 26 (FIG. 1).

Specifically, when the traveling mode is input via selection switch 26 as selected by the user, traveling mode selecting unit 215 forcibly selects the HV mode or the EV mode in accordance with this selection instruction. On the other hand, when the user does not input the forcible selection instruction, traveling mode selecting unit 215 automatically select a traveling mode in accordance with the SOC.

In such automatic traveling mode selection, traveling mode selecting unit 215 selects the EV mode when the estimated SOC is higher than mode determination value Sth. On the other hand, when the SOC estimate value is decreased to mode determination value Sth during the EV mode, traveling mode selecting unit 215 switches the traveling mode from the EV mode to the HV mode.

Figure 3:
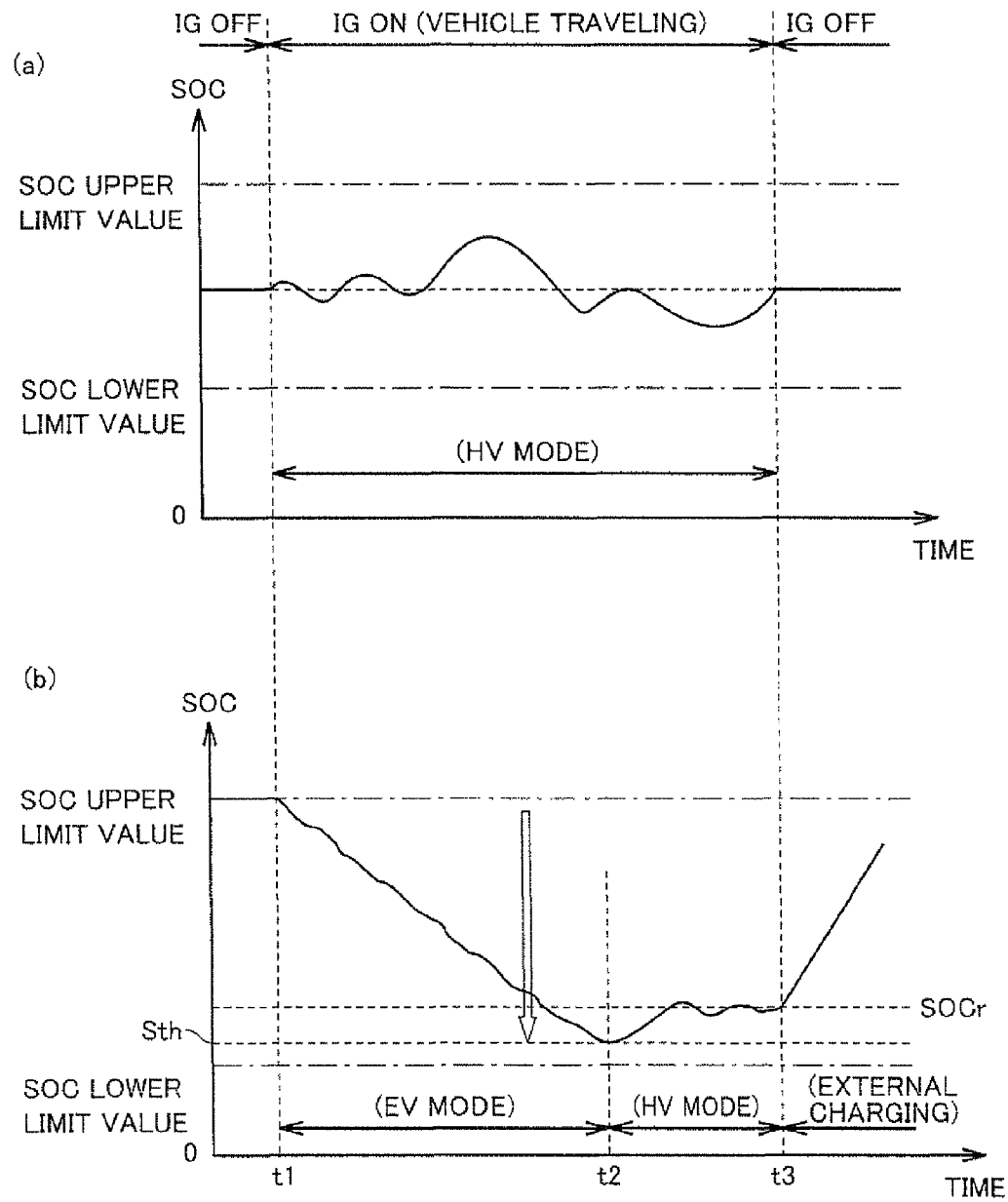
FIG. 3 is a schematic view illustrating a temporal change of SOC of the power storage device depending on vehicle traveling.

Here, with reference to FIG. 3, the following describes temporal change in the SOC of power storage device 10 in accordance with the vehicle traveling.

For comparison, FIG. 3(*a*) shows change of SOC in a hybrid vehicle having no externally chargeable function, whereas FIG. 3(*b*) shows the change of the SOC in the vehicle traveling involving the traveling mode selection in hybrid vehicle 5 according to the present embodiment. It should be noted that FIG. 3(*b*) assumes that the automatic traveling mode selection is performed based on the SOC.

Referring to FIG. 3(*a*), in the hybrid vehicle having no externally chargeable function, a control center value SOCr is set at a substantially intermediate value between the SOC upper limit value and the SOC lower limit value of power storage device 10. It should be noted that the SOC upper limit value and the SOC lower limit value correspond to the upper and lower limit values of the management range of the SOC. The management range is determined by properties of power storage device 10 (representatively, battery properties). Namely, the SOC upper limit value and the SOC lower limit value are set to fall out of an overcharge region and an overdischarge region, in each of which the properties of power storage device 10 may be damaged.

During a period of IG ON (vehicle traveling), in the hybrid vehicle having no externally chargeable function, the electric power charged to and discharged from power storage device 10 is controlled to maintain the SOC estimate value of power storage device 10 within a predetermined control range having control center value SOCr as its center.

Referring to FIG. 3(*b*), in hybrid vehicle 5 having the externally chargeable function in the present embodiment, during the period of IG OFF, power storage device 10 is charged to a value near the SOC upper limit value. Further, when the ignition ON command is provided to start traveling of hybrid vehicle 5 (time t1), the SOC estimate value is higher than mode determination value Sth. Hence, the EV mode is selected.

By traveling in the EV mode, the SOC of power storage device 10 is gradually decreased. When the SOC estimate value is decreased to reach mode determination value Sth (time t2), the traveling mode is changed from the EV mode to the HV mode. When the HV mode is selected, engine 18 (FIG. 1) starts to operate, thereby charging power storage device 10 with electric power generated by first motor generator MG1. Accordingly, the SOC starts to be increased.

For next external charging, control center value SOCr in the HV mode is set at a value relatively lower than control center value SOCr set shown in FIG. 3(*a*) in the hybrid vehicle having no externally chargeable function. Namely, the SOC in the HV mode is a value relatively close to the SOC lower limit value.

When the traveling of hybrid vehicle 5 is completed, the driver connects connector portion 350 (FIG. 1) to hybrid vehicle 5, thereby starting the external charging (time t3). Accordingly, the SOC of power storage device 10 starts to be increased.

Referring to FIG. 2 again, traveling control unit 210 calculates vehicle driving power and vehicle braking power required in the entire hybrid vehicle 5, in response to the driver's request. The driver's request includes an amount of stepping on an accelerator pedal, a position of a shift lever, or the like (neither of them is not shown). Further, traveling control unit 210 puts a restriction so as to charge or discharge power storage device 10 within the chargeable/dischargeable electric power range (Win-Wout) based on a state of power storage device 10, and determines output requests for motor generators MG1, MG2 and an output request for engine 18 to achieve the requested vehicle driving power or vehicle braking power.

On this occasion, the traveling mode selected by traveling mode selecting unit 215 and the SOC estimate value of power storage device 10 are reflected in the calculation for the output requests for engine 18 and motor generators MG1, MG2. Specifically, when the EV mode is selected, the output requests for engine 18 and motor generators MG1, MG2 are determined so as to orient the vehicle toward traveling actively using electric power in power storage device 10 while restricting (ideally, stopping) the output of engine 18 to the minimum.

On the other hand, when the HV mode is selected, the vehicle is oriented toward traveling to maintain the SOC estimate value within the control range dependent on control center value SOCr. Namely, when the SOC estimate value exceeds the control range, the vehicle is oriented toward traveling using actively electric power in power storage device 10 while restricting or stopping the output of engine 18. On the other hand, when the SOC estimate value falls below the control range, the output requests for engine 18 and motor generators MG1, MG2 are determined to internally charge power storage device 10 using the engine output.

Engine 18 is controlled by an engine ECU not shown in the figures to operate in accordance with the output request.

Distributing unit 204 calculates torques and rotational speeds of motor generators MG1, MG2 in accordance with the output requests determined by traveling control unit 210 and provided for motor generators MG1, MG2, and outputs control commands therefor to inverter control unit 208 and outputs a control command for DC voltage Vh to converter control unit 206.

Inverter control unit 208 generates, in accordance with the control commands from distributing unit 204, switching commands PWM1 and PWM2 for driving motor generators MG1 and MG2. Switching commands PWM1 and PWM2 are respectively sent to inverters 8-1 and 8-2.

Converter control unit 206 generates a switching command PWC in accordance with the control command from distributing unit 204, so as to control DC voltage Vh. In accordance with switching command PWC, converter 6 operates to convert voltage so as to control electric power charged to and discharged from power storage device 10.

In this way, traveling control for hybrid vehicle 5 is achieved to improve energy efficiency in accordance with the vehicle condition and driver's request including the traveling mode selection.

(Charging/Discharging Control Upon Detection of Malfunction)

The following describes charging/discharging control for power storage device 10 in the hybrid vehicle of the embodiment of the present invention when a malfunction takes place in a system associated with power storage device 10 (hereinafter, referred to as "battery system").

Malfunction detecting unit 220 detects a malfunction associated with power storage device 10 in the battery system including power storage device 10 and a detection system therefor, in response to input of a malfunction code from monitoring unit 11.

It should be noted that the malfunction code can be generated using a self-diagnostic signal or the like automatically generated in the event of failure by each device and sensor generally provided. Hence, the malfunction code will not be described in detail.

Further, malfunction detecting unit 220 stores a table in which malfunction codes, relevant malfunction details, and degrees of malfunctions are associated with one another. Based on a malfunction code, it can be detected what device in the battery system has what failure in what degree.

The malfunctions in the battery system can be stratified into the following malfunctions: a malfunction (hereinafter, also referred to as "heavy failure") at a level requiring immediate interruption of the charging/discharging path for power storage device 10 by interrupting system main relay 7 (FIG. 1); and a malfunction (hereinafter, also referred to as "light failure") at a level at which charging/discharging can be continued although precision in control is considered to be decreased. Namely, the heavy failure corresponds to a "first level malfunction" and the light failure corresponds to a "second level malfunction".

Examples of the heavy failure include an internal resistance malfunction in power storage device 10, and occurrence of overcharging or overdischarging. The overcharging or overdischarging is detected in response to an output of an overcharging (overvoltage) detection circuit (not shown) provided for each or a plurality of unit cells constituting power storage device 10. In addition, the heavy failure is also detected when the SOC estimate value falls out of the management range extending from the SOC lower limit value to the SOC upper limit value. Furthermore, the internal resistance can be detected based on voltage Vb and current Ib of power storage device 10.

Also, the heavy failure is detected when a malfunction in the sensor system takes place, such as a malfunction of current sensor 14, a malfunction in the overcharging detection circuit, or malfunctions of all the sensors of the plurality of temperature sensors 12 and voltage sensors 13 provided in the power storage device. Further, the heavy failure is also detected when a malfunction for the system of monitoring unit 11 occurs such as a malfunction in communication between monitoring unit 11 and control device 100 or a malfunction in monitoring unit 11 itself. Further, the heavy failure is also detected when the temperature of power storage device 10 becomes too high.

Meanwhile, examples of the light failure include failures in cooling system (not shown) in power storage device 10, such as malfunctions in a cooling fan (not shown) and an intake air temperature sensor (not shown). Further, the light failure is detected when a part of temperature sensors 12 or voltage sensors 13 have a malfunction. Furthermore, when some malfunction takes place in monitoring unit 11 during the period of IG OFF, the malfunction is not immediately regarded as the heavy failure and is regarded as the light failure.

Malfunction processing unit 230 performs malfunction processing based on a detail of the malfunction detected by malfunction detecting unit 220. Specifically, when there occurs a malfunction for which it is not preferable to continue charging/discharging power storage device 10, i.e., when the above-described heavy failure is detected, malfunction processing unit 230 generates an interrupt request for system main relay 7. In response to this interrupt request, a relay control signal SE (FIG. 7) is generated to interrupt system main relay 7. For improved convenience in repairing, a diagnosis code for specifying a detail of the failure or the like is generated. When required, the vehicle's user is notified of the occurrence of the heavy failure by means of a message output on display unit 20.

On the other hand, upon occurrence of the light failure, the charging/discharging of power storage device 10 is not stopped immediately and normal vehicle traveling is continued. Namely, the interrupt request for system main relay 7 is not generated. However, precision in the charging/discharging control, specifically, precision in the control for the SOC is considered to decrease. Hence, the SOC control target (control range) in the HV mode is changed to a range higher than the range employed when no malfunction is detected (normal state). For example, malfunction processing unit 230 sets a control center value SOCr#, which is employed upon detection of a malfunction, at a value higher than control center value SOCr employed when no malfunction is detected.

Further, when a malfunction is detected, the mode determination value for determining whether to switch from the EV mode to the HV mode is also changed to a value higher than the value employed when no malfunction is detected (normal state), in order to handle the occurrence of the malfunction before changing over to the HV mode. Namely, malfunction processing unit 230 sets a mode determination value Sth#, which is employed upon detection of a malfunction, at a value higher than mode determination value Sth employed when no malfunction is detected. Control center value SOCr# and mode determination value Sth# are sent from malfunction processing unit 230 to traveling control unit 210 when a malfunction is detected, more particularly, when the light failure is detected.

Further, when the malfunction (light failure) is detected, malfunction processing unit 230 causes display unit 20 to output a message urging the user to select the HV mode, or a message notifying the user of occurrence of the malfunction (light failure) in the battery system. The diagnosis code is also generated in the same manner as that for the heavy failure.

Figure 4:
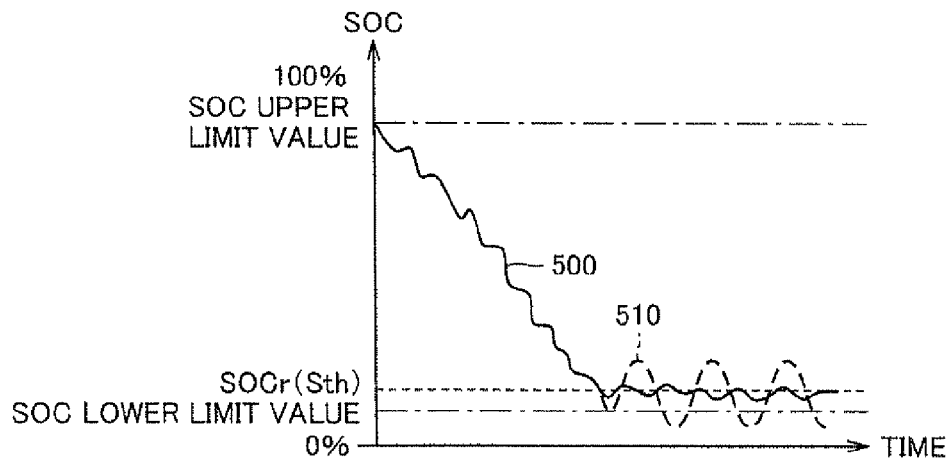
FIG. 4 is a schematic view illustrating settings for an SOC control center value and a mode determination value in the normal state.
Figure 5:
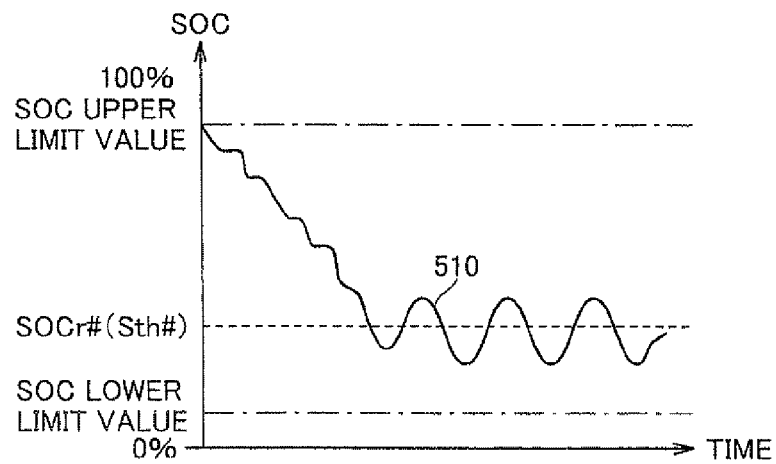
FIG. 5 is a schematic view illustrating settings for the SOC control center value and the mode determination value in accordance with the present embodiment, when a malfunction is detected.

The following describes settings for SOCr# and Sth# when the malfunction (light failure) is detected, with reference to FIG. 4 and FIG. 5. It should be noted that the mode determination value and the SOC control center value for the HV mode in FIG. 4 and FIG. 5 are set to be the same. They may be different values as shown in FIG. 3(b), or may be the same as shown in FIG. 4 and FIG. 5.

Referring to FIG. 4, in the EV mode, the SOC is decreased due to the vehicle traveling actively using electric power in power storage device 10. When the SOC estimate value is decreased to reach mode determination value Sth#, the HV mode is selected, whereby the SOC is maintained to fall within the control range dependent on control center value SOCr.

On this occasion, in the externally chargeable hybrid vehicle, mode determination value Sth# and control center value SOCr in the FIN mode are set at a value near the SOC lower limit value. Even so, the actual SOC never reaches the SOC lower limit value as indicated by a solid line 500 when the charging/discharging control is performed based on the SOC estimate value, because precision in the charging/discharging control is secured during the normal state in which the battery system has no malfunction.

However, when precision in the charging/discharging control is decreased as in the case of occurrence of the light failure and the control is performed based on the SOC estimate value as in the normal state, the actual SOC may be greatly fluctuated as indicated by a dotted line 510. When the fluctuation of the SOC becomes large, the discharging may wrongly proceed to a SOC region lower than the SOC lower limit value, i.e., to a level at which performance of power storage device 10 may be damaged.

On the other hand, if the malfunction in the battery system does not require immediate halt of use of power storage device 10 but power storage device 10 is stopped being used for fear of the overdischarging indicated by dotted line 510, there arises a problem in the user's convenience.

Hence, in the charging/discharging control of the hybrid vehicle according to the present embodiment, as shown in FIG. 5, when the malfunction (light failure) is detected, the SOC control target for the HV mode (for example, control center value SOC#) is set higher than the control target (for example, control center value SOC) employed in the normal state (when no malfunction is detected). Likewise, mode determination value Sth# is set higher than mode determination value Sth employed in the normal state (when no malfunction is detected).

As a result, even when the SOC is changed to fluctuate more greatly than that in the normal state due to decreased precision in the charging/discharging control (solid line 510), stable control can be achieved such that the actual SOC does not reach the SOC lower limit value for the HV mode or the EV mode if the malfunction is detected during the EV mode. In other words, in consideration of the decreased precision in the SOC control upon occurrence of the light failure, control center value SOC# and mode determination value Sth# are set to have margins so as not to decrease the actual SOC to the SOC lower limit value (management lower limit value).

Figure 6:
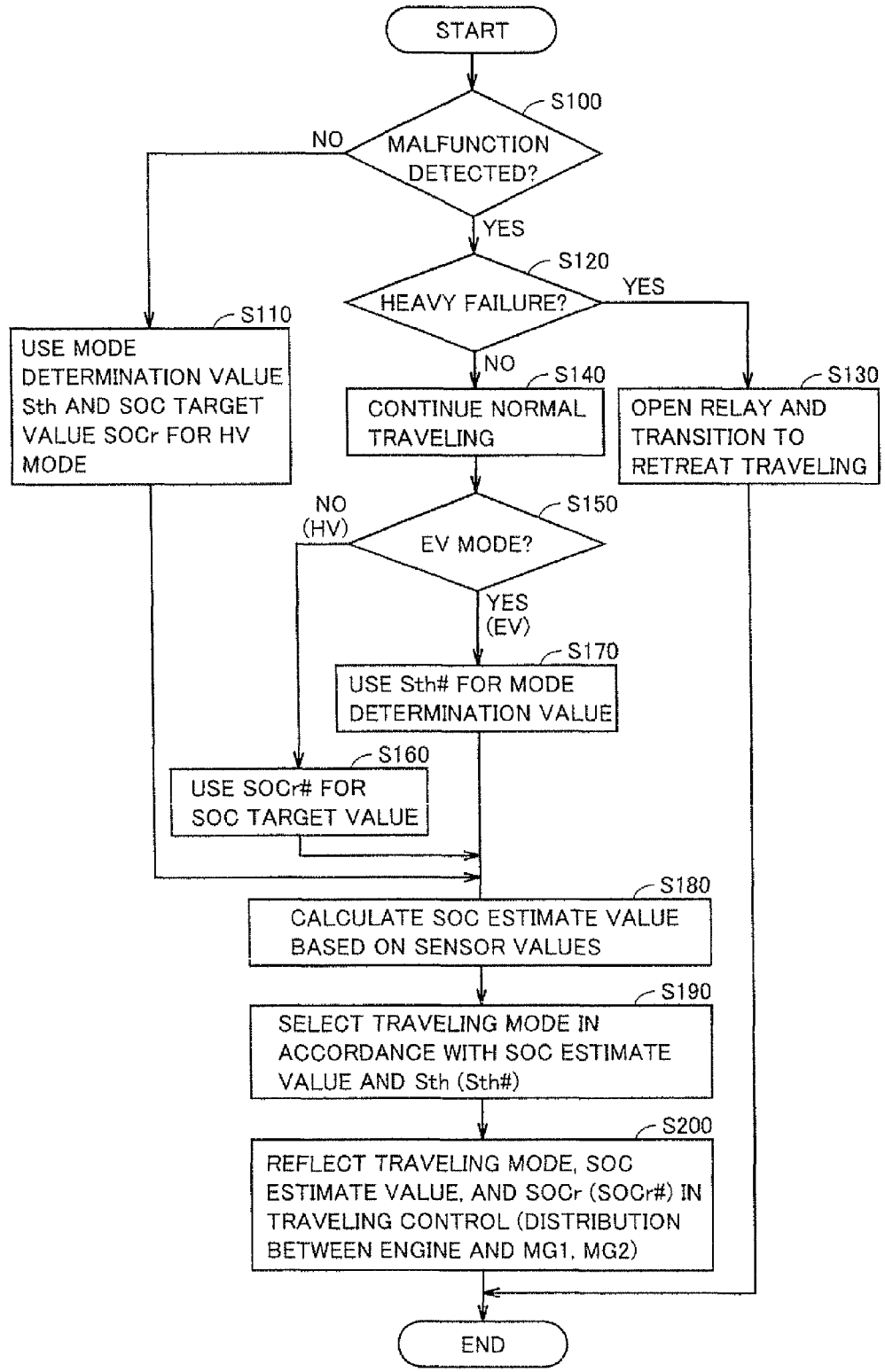
FIG. 6 is a flowchart showing a procedure of processes of the charging/discharging control for the hybrid vehicle according to the embodiment of the present invention.

FIG. 6 shows a flowchart illustrating a procedure of processes of the charging/discharging control in the hybrid vehicle according to the embodiment of the present invention. The series of processes shown in FIG. 6 are performed by control device 100 for every predetermined control cycle. Each step in the flowchart is basically implemented by software processing performed by control device 100, but may be implemented by hardware processing.

Referring to FIG. 6, in a step S100, control device 100 determines whether or not a malfunction is detected in the battery system. When no malfunction is detected in the battery system (determined as "NO" in S100), control device 100 sets, in a step S110, normal values for mode determination value Sth for the traveling mode and control center value SOCr for the HV mode. Accordingly, normal vehicle traveling control is performed.

On the other hand, when a malfunction is detected in the battery system (determined as "YES" in S100), control device 100 determines in a step S120 whether or not the malfunction is the heavy failure, which requires interruption of system main relay 7. Namely, the processes in steps S100 and S120 correspond to the functions of malfunction detecting unit 220 of FIG. 2.

When the heavy failure has occurred (determined as "YES" in S120), control device 100 proceeds with the process to step S130 so as to generate an interrupt request for system main relay 7. In this way, hybrid vehicle 5 transitions to retreat traveling, in which power storage device 10 is not utilized.

On the other hand, when a failure (light failure) not so severe as the heavy failure has taken place in the battery system (determined as "NO" in S120), control device 100 permits continuation of the normal traveling in a step S140. Namely, electric conduction in system main relay 7 is maintained, thus controlling the vehicle traveling involving charging/discharging of power storage device 10.

Further, when traveling in the EV mode (determined as "YES" in S150), control device 100 changes in step S170 the mode determination value to Sth# higher than normal value Sth. When traveling in the HV mode (determined as "NO" in S150), control device 100 changes in a step S160 the SOC control center value to SOCr#, which is higher than normal value SOCr. Further, in a step S170, it is preferable to use the display unit (FIG. 1) to output a message urging the user to change the traveling mode to the HV mode.

Namely, the processes in steps S130, S160, S170 correspond to the functions of malfunction processing unit 230 shown in FIG. 2. Thus, during the normal traveling, by steps S110, S160, S170, the mode determination value and the SOC control range (HV mode) are set.

Further, in a step S180, control device 100 calculates the SOC estimate value based on sensor values from monitoring unit 11. In accordance with the SOC estimate value and mode determination value Sth or Sth#, a traveling mode is selected (step S190). It should be noted that as described above, in selecting the traveling mode, the user's input to selection switch 26 (FIG. 1) is placed higher priority.

Further, in a step S200, control device 100 reflects, in the traveling control, the SOC estimate value and the traveling mode selected in step S190, thereby performing the traveling control in accordance with the driver's request. Specifically, distribution of outputs among engine 18 and motor generators MG1, MG2 is determined. Specifically, the process in step S180 corresponds to the function of state estimating unit 200 shown in FIG. 2, and the processes in steps S190, S200 correspond to the functions of traveling control unit 210 shown in FIG. 2. In particular, the process in step S190 corresponds to the function of traveling mode selecting unit 215 shown in FIG. 2.

As described above, according to the charging/discharging control in the hybrid vehicle according to the present embodiment, even when a malfunction associated with power storage device 10 takes place, in consideration of decrease in precision of the SOC control, the normal vehicle traveling involving charging/discharging of power storage device 10 can be performed while protecting power storage device 10 from overdischarging.

As a result, the normal vehicle traveling can be continued without prohibiting charging/discharging of power storage device 10 without exception whenever the malfunction takes place in the battery system, thereby protecting power storage device 10 and attaining the user's convenience at the same time.

It should be noted that FIG. 1 only illustrates the configuration in which only one power storage device 10 is provided, but the number of power storage devices 10 provided in the hybrid vehicle is not limited to one in the application of the present invention. In other words, depending on traveling performance required for hybrid vehicle 5 or the like, a plurality of power storage devices may be provided. In doing so, all or a part of the plurality of power storage devices are configured to be used in a sequential manner or a parallel manner. In such a configuration, in a manner similar to that in the malfunction processing in the present embodiment, the predetermined control range can be set for the traveling mode (HV mode) in which the SOC of a currently used power storage device is maintained to fall within the control range. Further, in the case where a traveling mode corresponding to the EV mode is provided, the mode determination value is also set in a similar manner to that in the malfunction processing in the present embodiment.

(Variation of Configuration of Power Storage Device)

As a variation of the configuration of the power storage device, the following describes application of the present invention to a configuration in which the charging/discharging control is performed for a plurality of power storage devices provided and divided into a main power storage device and auxiliary power storage devices.

Figure 7:
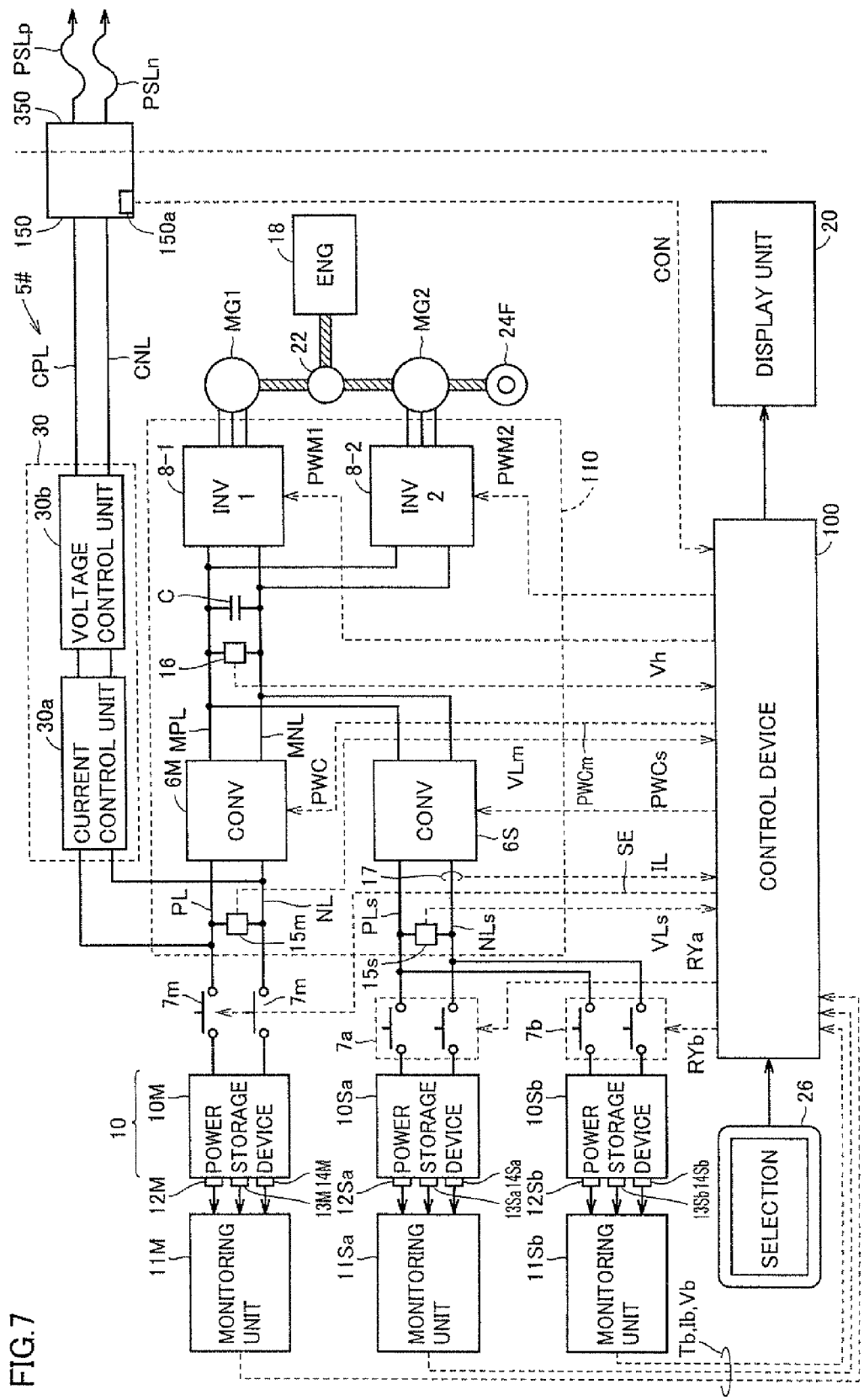
FIG. 7 is a schematic view showing a configuration of a hybrid vehicle to which charging/discharging control for a hybrid vehicle according to a variation of the embodiment of the present invention is applied.

Now, FIG. 7 is compared with FIG. 1. FIG. 7 shows a hybrid vehicle 5# according to the variation of the embodiment of the present invention. In hybrid vehicle 5#, power storage devices 10 are constituted by power storage devices 10M, 10Sa, 10Sb provided in parallel with power control unit 110. A monitoring unit 11, a temperature sensor 12, a voltage sensor 13, and a current sensor 14 are provided for each of the power storage devices, independently. Specifically, for power storage device 10M, a monitoring unit 11M, a temperature sensor 12M, a voltage sensor 13M, and a current sensor 14M are provided. For power storage device 10Sa, a monitoring unit 11Sa, a temperature sensor 12Sa, a voltage sensor 13Sa, and a current sensor 14Sa are provided. For power storage device 10Sb, a monitoring unit 11Sb, a temperature sensor 12Sb, a voltage sensor 13Sb, and a current sensor 14Sb are provided.

Regarding converters 6, there are provided a converter 6M corresponding to power storage device 10M (hereinafter, also referred to as "main power storage device") serving as a "main power storage unit", and a converter 6S shared by power storage devices 10Sa, 10Sb (hereinafter, also referred to as "auxiliary power storage device") each serving as an "auxiliary power storage unit".

Converters 6M and 6S are arranged in parallel with positive bus MPL and negative bus MNL for transferring the DC link voltage of inverters 8-1, 8-2. Converter 6M is configured to bidirectionally convert DC voltage between each of a positive line PL and a negative line NL and each of positive bus MPL and negative bus MNL. Converter 6S is configured to bidirectionally convert DC voltage between each of a positive line PLs and a negative line NLs and each of positive bus MPL and negative bus MNL.

The DC voltage between positive line PL and negative line NL is detected by a voltage sensor 15m, and the DC voltage between positive line PLs and negative line NLs is detected by a voltage sensor 15s. For converter 6S, a current sensor 17 is provided. Current sensor 17 measures a charging/discharging current for auxiliary power storage device 10Sa or 10Sb connected to converter 6S. A voltage detection value VLm detected by voltage sensor 15m, a voltage detection value VLs detected by voltage sensor 15s, and a current detection value IL detected by current sensor 17 are sent to control device 100 and are used for control of converters 6M and 6S.

Figure 8:
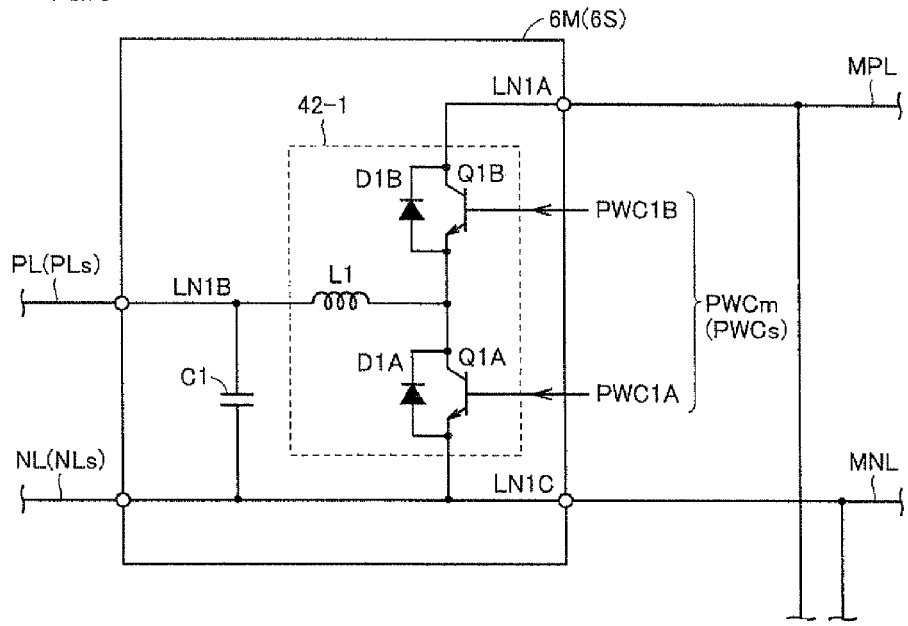
FIG. 8 is a circuit diagram illustrating an exemplary configuration of a converter shown in each of FIG. 1 and FIG. 7.

FIG. 8 shows the configuration of each of converters 6M, 6S in detail. It should be noted that the configurations and operations of converters 6M, 6S are the same and therefore only the configuration and operation of converter 6M will be described. It should be also noted that the same circuit configuration can be applied to converter 6 shown in FIG. 1.

Referring to FIG. 8, converter 6M includes a chopper circuit 42-1, a positive line LN1A, a negative line LN1C, a wire LN1B, and a smoothing capacitor C1. Chopper circuit 42-1 includes switching elements Q1A, Q1B, diodes D1A, D1B, and an inductor L1.

Positive line LN1A has one end connected to a collector of switching element Q1B, and has the other end connected to positive bus MPL. Negative line LN1C has one end connected to negative line NL, and has the other end connected to negative bus MNL.

Switching elements Q1A, Q1B are connected in series between negative line LN1C and positive line LN1A. Specifically, switching element Q1A has its emitter connected to negative line LN1C, and switching element Q1B has its collector connected to positive line LN1A. Diodes D1A, D1B are respectively connected to switching elements Q1A, Q1B in anti-parallel. Inductor L1 is connected between wire LN1B and a connection node of switching elements Q1A, Q1B.

Wire LN1B has one end connected to positive line PL, and has the other end connected to inductor L1. Smoothing capacitor C1 is connected between wire LN1B and negative line LN1C, and reduces an AC component included in DC voltage between wire LN1B and negative line LN1C.

Chopper circuit 42-1 bidirectionally converts DC voltage between main power storage device 10M (FIG. 7) and positive bus MPL and negative bus MNL, in accordance with a switching command PWCm from control device 100 (FIG. 7). Switching command PWCm includes: a driving signal PWC1A for controlling on/off of switching element Q1A that constitutes a lower arm element; and a driving signal PWC1B for controlling on/off of switching element Q IB that constitutes an upper arm element. Further, a duty ratio (ratio of ON/OFF periods) of switching elements Q1A, Q1B in a constant duty cycle (sum of ON period and OFF period) is controlled. Basically, switching elements Q1A, Q1B are complementarily controlled to be on/off, apart from a period of dead time.

When switching elements Q1A, Q1B are controlled to attain a large on-duty in switching element Q1A, an amount of pump current flowing from main power storage device 10M to inductor L1 is increased to accumulate large electromagnetic energy in inductor L1. This results in increased amount of current released from inductor L1 to positive bus MPL via diode D1B at a timing of transition of switching element Q1A from the ON state to the OFF state, thereby increasing voltage of positive bus MPL.

On the other hand, when switching element Q1A, Q1B are controlled to attain a large on-duty of switching element Q1B, the on-duty of switching element Q1A becomes small, thereby increasing an amount of current flowing from positive bus MPL to main power storage device 10M via switching element Q1B and inductor L1. Accordingly, voltage of positive bus MPL is decreased.

As such, by controlling the duty ratio of each of switching elements Q1A, Q1B, the voltage of positive bus MPL can be controlled and the direction and amount of the current flowing between main power storage device 10M and positive bus MPL (i.e., charging/discharging power) can be controlled.

Referring to FIG. 7 again, a system main relay 7m is provided between power storage device 10M and converter 6M, whereas a relay 7a is provided between power storage device 10Sa and converter 6S and a relay 7b is provided between power storage device 10Sb and converter 6S. Conduction (ON)/interruption (OFF) of relays 7m, 7a, 7b are controlled in accordance with relay control signals SE, RYa, RYb from control device 100. As with system main relay 7 of FIG. 1, each of relays 7m, 7a, 7b is shown as a representative example of the "opening/closing device".

By controlling on/off of relays 7a, 7b, one of auxiliary power storage devices 10Sa, 10Sb can be selectively connected to converter 6S. In the description below, the selected auxiliary power storage device connected to converter 6S is indicated by a reference character "10S".

In the configuration of FIG. 7, during vehicle traveling, charging/discharging within hybrid vehicle 5# can be handled using main power storage device 10M and selected auxiliary power storage device 10S. Configurations of the other portions of hybrid vehicle 5# are the same as those of hybrid vehicle 5 of FIG. 1 and therefore are not described in detail repeatedly.

In hybrid vehicle 5# shown in FIG. 7, power storage devices 10M, 10Sa, 10Sb are used in the EV mode and the HV mode in the following manner.

In the EV mode, one of auxiliary power storage devices 10Sa, 10Sb is selectively connected to converter 6S. Then, the vehicle is oriented toward traveling actively using electric power stored in selected auxiliary power storage device 10S and main power storage device 10M. Further, electric power in selected auxiliary power storage device 10S is preferentially used. When the SOC of auxiliary power storage device 10S is decreased, selected auxiliary power storage device 10S is switched. Namely, by reversing on/off of relays 7a, 7b, the EV traveling is continued using the other auxiliary power storage device and main power storage device 10M.

When the SOC of each of main power storage device 10M and the other auxiliary power storage device is decreased and the SOC estimate value of each power storage device is accordingly decreased to reach the mode determination value, the HV mode is selected instead of the EV mode. Further, in the HV mode, auxiliary power storage devices 10Sa, 10Sb are disconnected from converter 6S. Using only main power storage device 10M, the vehicle traveling is controlled to maintain the SOC thereof to fall within the control range. In other words, in hybrid vehicle 5# of FIG. 7, the charging/discharging configuration in the HV mode is the same as that in the HV mode of the hybrid vehicle 5 of FIG. 1.

Figure 9:
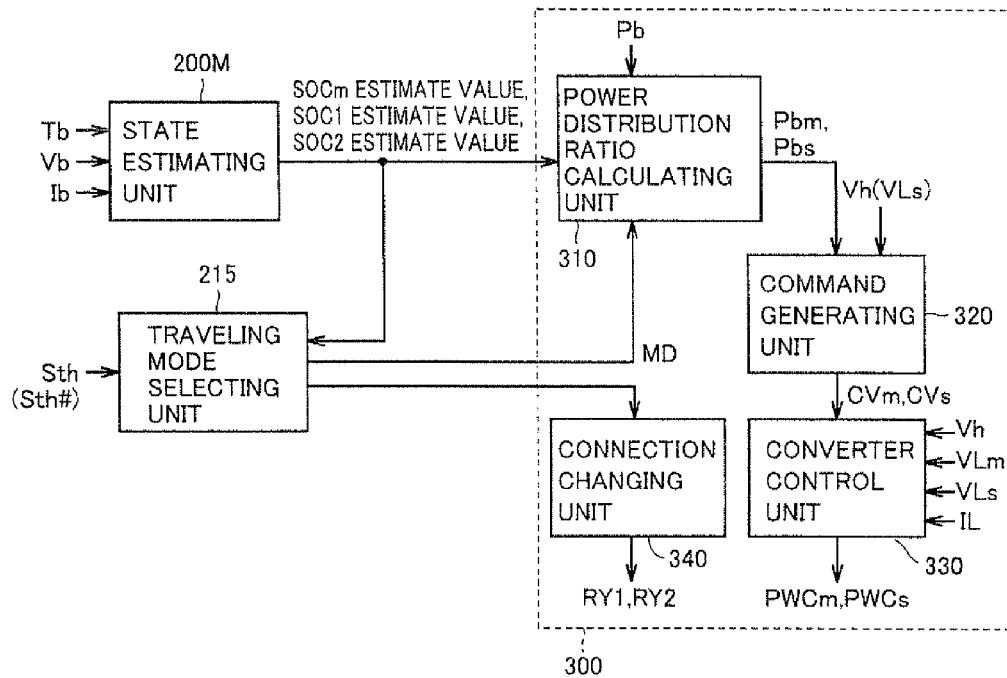
FIG. 9 is a function block diagram illustrating a configuration of charging/discharging control corresponding to a hybrid vehicle having a plurality of power storage devices.

FIG. 9 is a function block diagram illustrating a charging/discharging control configuration corresponding to hybrid vehicle 5# shown in FIG. 7. Each block shown in FIG. 9 may be constituted by a circuit (hardware) having a function corresponding to the block, or may be implemented by the ECU performing software processing in accordance with a predetermined program.

Referring to FIG. 9, state estimating unit 200 is configured to continuously calculate an SOCm estimate value, an SOC1 estimate value, and an SOC2 estimate value for each predetermined cycle based on temperature Tb, voltage Vb, and current Ib of each of power storage devices 10M, 10Sa, 10Sb. Temperature Tb, voltage Vb, and current Ib are obtained from monitoring units 11M, 11Sa, 11Sb. The SOCm estimate value represents a remaining level in main power storage device 10M. The SOC1 estimate value represents a remaining level in auxiliary power storage device 10Sa. The SOC2 estimate value represents a remaining level in auxiliary power storage device 10Sb.

Traveling mode selecting unit 215 selects one of the EV traveling mode and the HV traveling mode based on a comparison between each of estimate values of SOCm, SOCa, SOCb and mode determination value Sth (or Sth#), although the user's input to selection switch 26 (FIG. 1) is placed a higher priority. It should be noted that in the EV traveling mode, traveling mode selecting unit 215 outputs a signal for designating an auxiliary power storage device 10S.

A charging/discharging control unit 300 includes a power distribution ratio calculating unit 310, a command generating unit 320, a converter control unit 330, and a connection changing unit 340.

Power distribution ratio calculating unit 310 divides charging/discharging power Pb for all the power storage devices 10 into charging/discharging power Pbm for main power storage device 10M and charging/discharging power Pbs for selected auxiliary power storage device 10S. Charging/discharging power Pb is determined in accordance with determination of output requests for engine 18 and motor generators MG1, MG2. The output requests are determined by traveling control unit 210. This dividing is controlled in accordance with a selected traveling mode MD to balance usage of power storage device 10M and usage of selected auxiliary power storage device 10S.

Figure 10:
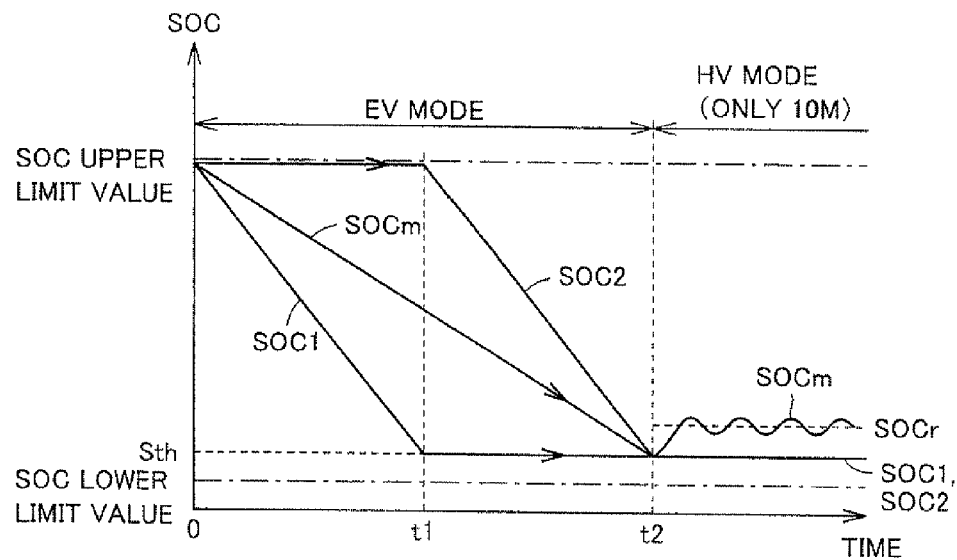
FIG. 10 is a first schematic view illustrating a manner of usage of the plurality of power storage devices depending on the traveling mode in the hybrid vehicle shown in FIG. 7.
Figure 11:
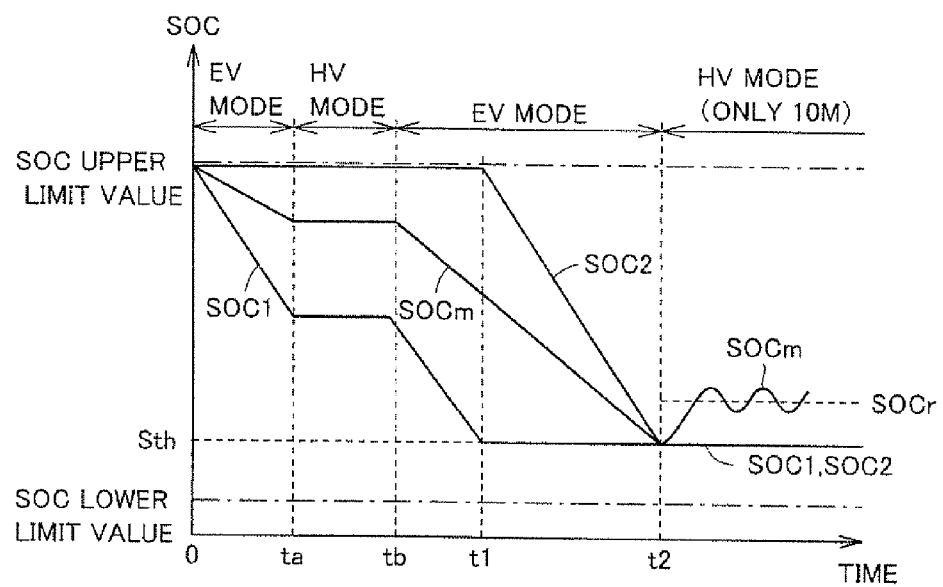
FIG. 11 is a second schematic view illustrating a manner of usage of the plurality of power storage devices depending on the traveling mode in the hybrid vehicle shown in FIG. 7.

Here, with reference to FIG. 10 and FIG. 11, the following describes the usage of the plurality of power storage devices 10M, 10Sa, 10Sb in hybrid vehicle 5# shown in FIG. 7. FIG. 10 shows a change of the SOC when a traveling mode is selected automatically based on the SOC without the user's traveling mode selection.

Referring to FIG. 10, at the start of the vehicle operation, each of power storage devices 10M, 10Sa, 10Sb has been externally charged to a value near the SOC upper limit value. As one example, in this state, auxiliary power storage device 10Sa is selected and vehicle traveling is started in the EV mode. During a period of the EV mode, electric power in selected auxiliary power storage device 10S is used in preference to electric power in main power storage device 10M in accordance with a predetermined ratio. As a result, SOC1 of auxiliary power storage device 10Sa is first decreased to reach mode determination value Sth (time tn. Meanwhile, at this moment, SOCm of main power storage device TOM is higher than mode determination value Sth.

Therefore, at time t1, relays 7a, 7b are controlled to switch selected auxiliary power storage device 10S from auxiliary power storage device 10Sa to auxiliary power storage device 10Sb. Even after time t1, the traveling in the EV mode is continued such that electric power in selected auxiliary power storage device 10S is preferentially used. At time t2, SOC2 of auxiliary power storage device 10Sb and SOCm of main power storage device 10M, which have been decreased with balance, reach mode determination value Sth.

In such a state, the traveling mode is switched from the EV mode to the HV mode. In the HV mode, each of relays 7a, 7b is off, and the vehicle travels using only main power storage device 10M. SOCm of main power storage device 10M is controlled to be maintained in the control range dependent on control center value SOCr, as with that of power storage device 10 of the configuration of FIG. 1.

FIG. 11 shows a change of SOC when the user operates to forcibly select the HV mode.

Referring to FIG. 11, the HV mode is forcibly selected by the user operating selection switch 26, during a period of time ta-tb in which the EV mode is selectable in the first place (period coming before time t2). When the HV mode is thus selected, traveling control unit 210 controls SOCm of main power storage device 10M and SOC1 or SOC2 of selected auxiliary power storage device 10S to maintain them at the values obtained at the start of the HV mode.

When the forcible selection of the HV mode is canceled (time tb), as with FIG. 10, charging/discharging of main power storage device 10M and selected auxiliary power storage device 105 is controlled to relatively preferentially use electric power in selected auxiliary power storage device 10S but to decrease SOC1 or SOC2 of selected auxiliary power storage device 10S and SOCm of main power storage device 10M with balance to reach mode determination value Sth in the end. After the SOC of each power storage device is decreased to reach mode determination value Sth, the HV mode is selected as with FIG. 10.

Referring to FIG. 9 again, power distribution ratio calculating unit 310 distributes charging/discharging power Pb in order to attain the manner of usage illustrated with reference to FIG. 10 and FIG. 11, thereby determining charging/discharging power Pbm of main power storage device 10M and charging/discharging power Pbs of selected auxiliary power storage device 10S.

In accordance with charging/discharging powers Pbm, Pbs thus set by power distribution ratio calculating unit 310, command generating unit 320 generates control commands CVm, CVs for converters 6M, 6S. For example, when converter 6M corresponding to main power storage device 10M is configured to control DC voltage Vh of positive bus MPL (DC link voltage of inverters 8-1, 8-2) to conform to the control command, and converter 6S corresponding to auxiliary power storage devices 10Sa, 10Sb is configured to control the charging/discharging current of the selected auxiliary power storage device, charging/discharging power for each of main power storage device 10M and selected auxiliary power storage device 10S can be also controlled because Pb=Pbm+Pbs.

In such a control configuration, control command CVm corresponds to a voltage command value for DC voltage Vh of positive bus MPL. Control command CVs corresponds to a current command value for charging/discharging current for selected auxiliary power storage device 10S.

Converter control unit 330 calculates a switching duty of each of converters 6S, 6M based on voltage and current values Vh, VLm, VLs, IL of converters 6M, 6S, and control commands CVm, CVs. In accordance with the switching duty, converter control unit 330 generates switching commands PWCm, PWCs for turning on/off switching elements Q1A, Q1B. Switching command PWCm is sent to converter 6M, and switching command PWCs is sent to converter 6S.

Connection changing unit 340 generates relay control signals RYa, RYb in accordance with results of selections made by traveling mode selecting unit 215 with regard to a traveling mode and an auxiliary power storage device. As understood from the description above, in the EV traveling mode, relay control signals RYa, RYb are generated to connect selected auxiliary power storage device 10S to converter 6S. Upon changing over auxiliary power storage device 10S, relay control signals RYa, RYb are generated to reverse the on/off of relays 7a, 7b. Further, in the HV traveling mode, relay control signals RYa, RYb are generated to turn off relays 7a, 7b.

Also in hybrid vehicle 5# shown in FIG. 7, when a malfunction is detected in the battery system (when a light failure is detected), control center value SOCr# in the HV mode (i.e., SOC control range) is set higher than control center value SOCr employed in the normal state (when no malfunction is detected). Further, mode determination value Sth# is also set higher than mode determination value Sth employed in the normal state (when no malfunction is detected). In other words, the procedure of the processes of the charging/discharging control of hybrid vehicle 5# is basically the same as those in the flowchart of FIG. 6.

It should be noted that in the configuration of FIG. 7, when a heavy failure is detected, each of system main relays 7m and relays 7a, 7b is controlled to be interrupted (turned off), thereby forcibly interrupting the charging/discharging path for each of power storage devices 10M, 10Sa, 10Sb. Further, the traveling mode selection in step S190 and the traveling control in step S200 in FIG. 6 are performed in accordance with the explanation made with reference to FIG. 10 and FIG. 11.

Figure 12:
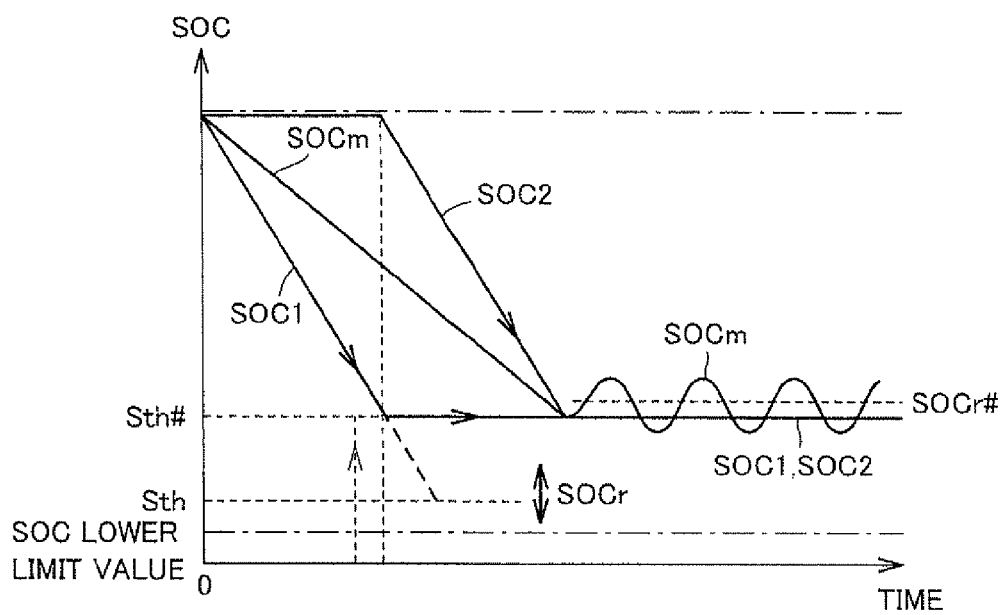
FIG. 12 is a schematic view illustrating the traveling mode and a temporal change of the SOC in the case where the settings for the SOC control center value and the mode determination value in the malfunction detection according to the present embodiment are applied to the hybrid vehicle shown in FIG. 7.

As a result, as shown in FIG. 12, control center value SOCr# for the HV mode is set higher than the normal value (SOCr) set at a value near the SOC lower limit value. Accordingly, even when a range of fluctuation of actual SOCm is increased due to decreased control precision resulting from a malfunction (light failure) taking place in the battery system, vehicle traveling can be continued in the HV mode while protecting main power storage device 10M from overdischarging to fall below the SOC lower limit value.

Further, in consideration of the SOC control precision decreased due to occurrence of a malfunction (light failure) in the battery system during the EV mode, mode determination value Sth# is set higher than the normal value (Sth) set at the value near the SOC lower limit value, whereby the vehicle traveling can be continued in the EV mode while protecting each power storage device 10M, 10Sa, 10Sb from overdischarging to fall below the SOC lower limit value.

Thus, also in hybrid vehicle 5# shown in FIG. 7, in consideration of the decrease of the SOC control precision upon occurrence of a light malfunction in the battery system, the normal vehicle traveling can be performed while protecting each of power storage devices 10M, 10Sa, 10Sb from overdischarging. Namely, the normal vehicle traveling can be continued without prohibiting charging/discharging of each of power storage device 10M, 10Sa, 10Sb without exception, thereby protecting each of power storage devices 10M, 10Sa, 10Sb and attaining the user's convenience at the same time.

It should be noted that in the configuration of FIG. 7, the number of auxiliary power storage devices may be any number other than 2. In other words, one auxiliary power storage device may be provided, which does not involve switching of selected auxiliary power storage device 10S. Alternatively, three or more auxiliary power storage devices are provided, which involves switching of selected auxiliary power storage device 10S for multiple times.

It should be confirmed that the application of the present invention is not limited to the hybrid vehicles configured as shown in FIG. 1 and FIG. 7. In other words, the charging/discharging control for a power storage device in the present invention can be performed by any hybrid vehicle having an engine, a motor, and a power storage device externally chargeable and storing electric power for driving the motor, as well as a traveling mode in which a remaining level (SOC) in the power storage device is maintained in a predetermined control range.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

INDUSTRIAL APPLICABILITY

The present invention is applicable to a hybrid vehicle having a power storage device chargeable by an external power source.

The invention claimed is:

1. A charging/discharging control system for a hybrid vehicle including an internal combustion engine and a motor each serving as a motive power source, and a power storage device configured to be capable of receiving and supplying electric power from and to said motor, the charging/discharging control system comprising:

an externally charging unit configured to charge said power storage device using an electric power source external to the vehicle;

an electric power generating unit configured to generate electric power for charging said power storage device, using an output of said internal combustion engine;

a charge state estimating unit configured to estimate a remaining level in said power storage device based on a state detection value of said power storage device;

a traveling control unit for controlling operations of said internal combustion engine and said motor to encourage internal charging using said electric power generating unit when a remaining level estimate value obtained from said charge state estimating unit is decreased to fall below a control target during a vehicle operation in a first traveling mode in which said internal combustion engine and said motor are used to maintain the remaining level of said power storage device within a predetermined control range;

a malfunction detecting unit configured to detect a malfunction associated with said power storage device; and a malfunction processing unit configured to set said control target at a value higher than that employed when no malfunction is detected, when said malfunction detecting unit detects the malfunction, said traveling control unit including a traveling mode selecting unit configured to select a second traveling mode until said remaining level estimate value is decreased to reach a mode determination value, and select said first traveling mode once said remaining level estimate value is decreased to reach said mode determination value, in said second traveling mode, said internal combustion engine and said motor being used to travel mainly using said motor with said internal charging being stopped, said malfunction processing unit being configured to set said mode determination value at a value higher than that employed when no malfunction is detected, when said malfunction is detected during the vehicle operation in said second traveling mode.

2. The charging/discharging control system for the hybrid vehicle according to claim 1, wherein:

said malfunction detecting unit stratifies detected malfunctions into first and second levels, and when a malfunction of said first level is detected, said malfunction processing unit generates an interrupt request made for an opening/closing device to interrupt a charging/discharging path for said power storage device, and when a malfunction of said second level is detected, said malfunction processing unit sets said control target at a value higher than that employed when no malfunction is detected, without generating said interrupt request.

3. The charging/discharging control system for the hybrid vehicle according to claim 1, wherein:

said malfunction detecting unit stratifies detected malfunctions into first and second levels, and when a malfunction of said first level is detected, said malfunction processing unit generates an interrupt request made for an opening/closing device to interrupt a charging/discharging path for said power storage device, and when a malfunction of said second level is detected, said malfunction processing unit sets said mode determination value at a value higher than that employed when no malfunction is detected, without generating said interrupt request.

4. The charging/discharging control system for the hybrid vehicle according to claim 1, wherein:

said power storage device includes a plurality of power storage units, and said charge state estimating unit is configured to calculate said remaining level estimate value for each of said plurality of power storage units, the charging/discharging control system further comprising:

a power control unit configured to control bidirectional conversion of electric power between said power storage device and each of said motor and said electric power generating unit;

a plurality of opening/closing devices provided between said power control unit and said plurality of power storage units; and a connection changing unit configured to control connection between each of said plurality of power storage units and said power control unit by controlling said plurality of opening/closing devices, wherein:

in said first traveling mode, said connection changing unit connects a part of said plurality of power storage units to said power control unit, and during the vehicle operation in said first traveling mode, said traveling control unit controls operations of said internal combustion engine and said motor to encourage said internal charging, when said remaining level estimate value of said part of said plurality of power storage units is decreased to fall below said control target.

5. The charging/discharging control system for the hybrid vehicle according to claim 4, wherein:

said plurality of power storage units are classified into a main power storage unit and at least one auxiliary power storage unit(s), said traveling control unit includes a traveling mode selecting unit configured to select a second traveling mode until the remaining level estimate value of each of said power storage units is decreased to reach a mode determination value, and select said first traveling mode once the remaining level estimate value of each of said power storage units is decreased to reach said mode determination value, in said second traveling mode, said internal combustion engine and said motor being used to travel mainly using said motor with said internal charging being stopped, said connection changing unit is configured to connect said main power storage unit to said power control unit and disconnect each said auxiliary power storage unit from said power control unit in said first traveling mode, and is configured to connect said main power storage unit to said power control unit and connect said at least one auxiliary power storage unit(s) to said power control unit one after another in said second traveling mode to use each said auxiliary power storage unit sequentially until the remaining level estimate value of each said auxiliary power storage unit is decreased to reach said mode determination value, and when said malfunction is detected during the vehicle operation in said second traveling mode, said malfunction processing unit is configured to set said mode determination value at a value higher than that employed when no malfunction is detected.

6. The charging/discharging control system for the hybrid vehicle according to claim 4, wherein:

said malfunction detecting unit stratifies detected malfunctions into first and second levels, and when a malfunction of said first level is detected, said malfunction processing unit generates a forcible interrupt request made for said plurality of opening/closing devices, and when a malfunction of said second level is detected, said malfunction processing unit sets said control target at a value higher than that employed when no malfunction is detected, without generating said interrupt request.

7. The charging/discharging control system for the hybrid vehicle according to claim 5, wherein:
said malfunction detecting unit stratifies detected malfunctions into first and second levels, and
when a malfunction of said first level is detected, said malfunction processing unit generates a forcible interrupt request made for said plurality of opening/closing devices, and when a malfunction of said second level is detected, said malfunction processing unit sets said mode determination value at a value higher than that employed when no malfunction is detected, without generating said interrupt request.

8. The charging/discharging control system for the hybrid vehicle according to claim 1, wherein when said malfunction is detected, said malfunction processing unit sets said control target to attain a margin such that even when said remaining level estimate value is decreased to reach said control target, an actual remaining level of said power storage device or said part of said plurality of power storage units is not decreased to reach a management lower limit value.

9. The charging/discharging control system for the hybrid vehicle according to claim 1, wherein when said malfunction is detected, said malfunction processing unit sets said mode determination value to attain a margin such that even when said remaining level estimate value is decreased to reach said mode determination value, an actual remaining level of said power storage device or each of said power storage units is not decreased to reach a management lower limit value.

10. A method for controlling a charging/discharging control system for a hybrid vehicle including an internal combustion engine and a motor each serving as a motive power source, and a power storage device configured to receive and supply electric power from and to said motor,
the charging/discharging control system including
an externally charging unit configured to charge said power storage device using an electric power source external to the vehicle, and
an electric power generating unit configured to generate electric power for charging said power storage device, using an output of said internal combustion engine,
the method comprising the steps of:
detecting a malfunction associated with said power storage device;
setting a control target of a remaining level of said power storage device at a value higher than that employed when no malfunction is detected, when said malfunction is detected during a vehicle operation in a first traveling mode in which said internal combustion engine and said motor are used to maintain the remaining level of said power storage device within a predetermined control range;
calculating a remaining level estimate value of said power storage device based on a state detection value of said power storage device;
controlling operations of said internal combustion engine and said motor to encourage internal charging using said electric power generating unit when said remaining level estimate value is decreased to fall below said control target during the vehicle operation in said first traveling mode;
selecting a second traveling mode until said remaining level estimate value is decreased to reach a mode determination value, and selecting said first traveling mode once said remaining level estimate value is decreased to reach said mode determination value, in said second traveling mode, said internal combustion engine and said motor being used to mainly travel using said motor with said internal charging being stopped; and
setting said mode determination value, which is employed in the step of selecting, at a value higher than that employed when no malfunction is detected, when said malfunction is detected during a vehicle operation in said second traveling mode.

11. The method for controlling the charging/discharging control system for the hybrid vehicle according to claim 10, further comprising the steps of:
stratifying detected malfunctions into first and second levels; and
generating, when a malfunction of said first level is detected, an interrupt request made for an opening/closing device to interrupt a charging/discharging path for said power storage device, wherein
when a malfunction of said second level is detected, the step of setting sets said control target at a value higher than that employed when no malfunction is detected, without generating said interrupt request.

12. The method for controlling the charging/discharging control system for the hybrid vehicle according to claim 10, further comprising the steps of:
stratifying detected malfunctions into first and second levels;
generating, when a malfunction of said first level is detected, an interrupt request made for an opening/closing device to interrupt a charging/discharging path for said power storage device, wherein
when a malfunction of said second level is detected, the step of setting sets said mode determination value at a value higher than that employed when no malfunction is detected, without generating said interrupt request.

13. The method for controlling the charging/discharging control system for the hybrid vehicle according to claim 10, wherein:
said power storage device includes a plurality of power storage units,
the charging/discharging control system further including
a power control unit configured to control bidirectional conversion of electric power between said power storage device and each of said motor and said electric power generating unit,
a plurality of opening/closing devices connected between said power control unit and said plurality of power storage units, and
a connection changing unit configured to control connection between each of said plurality of power storage units and said power control unit by controlling said plurality of opening/closing devices,
in said first traveling mode, said connection changing unit connects a part of said plurality of power storage units to said power control unit,
the step of calculating calculates said remaining level estimate value for each of said plurality of power storage units, and
during the vehicle operation in said first traveling mode, the step of controlling controls operations of said internal combustion engine and said motor to encourage internal charging using said electric power generating unit, when said remaining level estimate value of said part of said plurality of power storage units is decreased to fall below said control target.

14. The method for controlling the charging/discharging control system for the hybrid vehicle according to claim 13, wherein:
said plurality of power storage units are classified into a main power storage unit and at least one auxiliary power storage unit(s),
said connection changing unit is configured to connect said main power storage unit to said power control unit and disconnect each said auxiliary power storage unit from said power control unit in said first traveling mode, and is configured to connect said main power storage unit to said power control unit and connect said at least one auxiliary power storage unit(s) one after another to said power control unit in a second traveling mode to use each said auxiliary power storage unit sequentially until the remaining level estimate value of each said auxiliary power storage unit is decreased to reach a mode determination value, in said second traveling mode, said internal combustion engine and said motor being used to travel mainly using said motor with said internal charging being stopped,
the method further comprising the steps of:
selecting said second traveling mode until said remaining level estimate value of each of said power storage units is decreased to reach said mode determination value, and selecting said first traveling mode once said remaining level estimate value of each of said power storage units is decreased to reach said mode determination value; and
setting said mode determination value, which is employed in the step of selecting, at a value higher than that employed when no malfunction is detected, when said malfunction is detected during the vehicle operation in said second traveling mode.

15. The method for controlling the charging/discharging control system for the hybrid vehicle according to claim 13, further comprising the steps of:
stratifying detected malfunctions into first and second levels; and
generating, when a malfunction of said first level is detected, a forcible interrupt request made for said plurality of opening/closing devices, wherein
when a malfunction of said second level is detected, the step of setting sets said control target at a value higher than that employed when no malfunction is detected, without generating said interrupt request.

16. The method for controlling the charging/discharging control system for the hybrid vehicle according to claim 14, further comprising the steps of:
stratifying detected malfunctions into first and second levels; and
generating, when a malfunction of said first level is detected, a forcible interrupt request made for said plurality of opening/closing devices, wherein
when a malfunction of said second level is detected, the step of setting sets said mode determination value at a value higher than that employed when no malfunction is detected, without generating said interrupt request.

17. The method for controlling the charging/discharging control system for the hybrid vehicle according to claim 10, wherein when said malfunction is detected, the step of setting sets said control target to attain a margin such that even when said remaining level estimate value is decreased to reach said control target, an actual remaining level of said power storage device or said part of said plurality of power storage units is not decreased to reach a management lower limit value.

18. The method for controlling the charging/discharging control system for the hybrid vehicle according to 10, wherein when said malfunction is detected, the step of setting sets said mode determination value to attain a margin such that even when said remaining level estimate value is decreased to reach said mode determination value, an actual remaining level of said power storage device or each of said power storage units is not decreased to reach a management lower limit value.

19. A charging/discharging control system for a hybrid vehicle including an internal combustion engine and a motor each serving as a motive power source, and a power storage device configured to be capable of receiving and supplying electric power from and to said motor, the charging/discharging control system comprising:
an externally charging unit configured to charge said power storage device using an electric power source external to the vehicle;
an electric power generating unit configured to generate electric power for charging said power storage device, using an output of said internal combustion engine;
a charge state estimating unit configured to estimate a remaining level of said power storage device based on a state detection value of said power storage device;
a traveling control unit for controlling operations of said internal combustion engine and said motor to encourage internal charging using said electric power generating unit when a remaining level estimate value obtained from said charge state estimating unit is decreased to fall below a control target during a vehicle operation in a first traveling mode in which said internal combustion engine and said motor are used to maintain the remaining level of said power storage device within a predetermined control range;
a malfunction detecting unit configured to detect a malfunction associated with said power storage device; and
a malfunction processing unit configured to set said control target at a value higher than that employed when no malfunction is detected, when said malfunction detecting unit detects a malfunction,
when said malfunction is detected, said malfunction processing unit setting said control target to attain a margin such that even when said remaining level estimate value is decreased to reach said control target, an actual remaining level of said power storage device or said part of power storage units is not decreased to a management lower limit value.

20. A method for controlling a charging/discharging control system for a hybrid vehicle including an internal combustion engine and a motor each serving as a motive power source, and a power storage device configured to receive and supply electric power from and to said motor,
the charging/discharging control system including
an externally charging unit configured to charge said power storage device using an electric power source external to the vehicle, and
an electric power generating unit configured to generate electric power for charging said power storage device, using an output of said internal combustion engine,
the method comprising the steps of:
detecting a malfunction associated with said power storage device;
setting a control target of a remaining level of said power storage device at a value higher than that employed when no malfunction is detected, when said malfunction is detected during a vehicle operation in a first traveling mode in which said internal combustion engine and said motor are used to maintain the remaining level of said power storage device within a predetermined control range;

calculating a remaining level estimate value of said power storage device based on a state detection value of said power storage device; and controlling operations of said internal combustion engine and said motor to encourage internal charging using said electric power generating unit when said remaining level estimate value is decreased to fall below said control target during the vehicle operation in said first traveling mode, when said malfunction is detected, the step of setting setting said control target to attain a margin such that even when said remaining level estimate value is decreased to reach said control target, an actual remaining level of said power storage device or said part of said plurality of power storage units is not decreased to reach a management lower limit value.

* * * * *